(12) United States Patent
Schileru

(10) Patent No.: US 11,540,022 B2
(45) Date of Patent: *Dec. 27, 2022

(54) METHOD AND SYSTEM FOR SEGMENTING VIDEO WITHOUT TAMPERING VIDEO DATA

(71) Applicant: Rodica Schileru, San Jose, CA (US)

(72) Inventor: Rodica Schileru, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,936

(22) Filed: Apr. 21, 2021

(65) Prior Publication Data

US 2022/0329911 A1 Oct. 13, 2022

Related U.S. Application Data

(63) Continuation of application No. 16/139,656, filed on Sep. 24, 2018, now Pat. No. 10,992,991, which is a continuation of application No. 14/701,477, filed on Apr. 30, 2015, now Pat. No. 10,096,342.

(51) Int. Cl.

| | | |
|---|---|---|
| *H04N 21/472* | (2011.01) | |
| *H04N 21/845* | (2011.01) | |
| *H04N 21/858* | (2011.01) | |
| *H04N 21/4788* | (2011.01) | |
| *H04N 21/81* | (2011.01) | |
| *H04N 21/8405* | (2011.01) | |
| *G11B 27/031* | (2006.01) | |
| *G11B 27/11* | (2006.01) | |
| *G11B 27/32* | (2006.01) | |
| *G06F 16/78* | (2019.01) | |

(52) U.S. Cl.
CPC ..... *H04N 21/47217* (2013.01); *G11B 27/031* (2013.01); *G11B 27/11* (2013.01); *G11B 27/322* (2013.01); *H04N 21/4788* (2013.01); *H04N 21/812* (2013.01); *H04N 21/8405* (2013.01); *H04N 21/8456* (2013.01); *H04N 21/858* (2013.01); *G06F 16/7867* (2019.01)

(58) Field of Classification Search
None
See application file for complete search history.

(56) References Cited

U.S. PATENT DOCUMENTS

| | | | | |
|---|---|---|---|---|
| 5,585,583 | A * | 12/1996 | Owen | G09B 15/00 84/454 |
| 6,480,852 | B1 * | 11/2002 | Himmel | G06F 16/9562 707/999.009 |
| 7,941,739 | B1 * | 5/2011 | Mohammed | G06F 9/5038 715/717 |
| 8,230,343 | B2 * | 7/2012 | Logan | H04N 21/4622 725/39 |
| 2003/0001907 | A1 * | 1/2003 | Bergsten | H04N 21/47 715/853 |

(Continued)

*Primary Examiner* — Gelek W Topgyal
(74) *Attorney, Agent, or Firm* — Joe Zheng

(57) ABSTRACT

Techniques segmenting a video using tags without modifying video data thereof are disclosed. According to one aspect of the present invention, each tag is created to define a portion of the video, wherein the tags can be modified, edited, looped, reordered or restored to a create an impression other than that if the video was played back sequentially. The tags are so structured in a table included in a tagging file that can be shared or published electronically or modified or updated by others. Further the table may be modified to include one or more conditional or commercial tags.

20 Claims, 18 Drawing Sheets

(56) References Cited

U.S. PATENT DOCUMENTS

| | | | |
|---|---|---|---|
| 2003/0016951 A1* | 1/2003 | Jakel | G11B 27/105 386/E5.064 |
| 2003/0033502 A1* | 2/2003 | Matsuzaki | H04N 5/76 712/200 |
| 2003/0093790 A1* | 5/2003 | Logan | H04N 21/6125 348/E7.071 |
| 2003/0094091 A1* | 5/2003 | Brinkman | G06Q 20/00 84/609 |
| 2006/0083481 A1* | 4/2006 | Yang | G11B 27/34 386/281 |
| 2006/0134590 A1* | 6/2006 | Huffman | G09B 5/06 434/307 A |
| 2006/0149781 A1* | 7/2006 | Blankinship | G11B 27/28 |
| 2008/0005126 A1* | 1/2008 | Sankaran | G06F 16/41 |
| 2008/0172399 A1* | 7/2008 | Chi | G06F 16/9562 |
| 2010/0088726 A1* | 4/2010 | Curtis | G11B 27/034 725/45 |
| 2011/0200116 A1* | 8/2011 | Bloch | G11B 27/10 375/E7.027 |
| 2011/0247479 A1* | 10/2011 | Helms | G10H 1/0016 84/613 |
| 2011/0317979 A1* | 12/2011 | Smith | H04N 21/4788 386/241 |
| 2012/0087637 A1* | 4/2012 | Logan | H04N 21/25891 386/241 |
| 2012/0102387 A1* | 4/2012 | Badoiu | G06F 16/7867 715/230 |
| 2013/0004145 A1* | 1/2013 | Li | H04N 21/42208 386/E5.052 |
| 2014/0115441 A1* | 4/2014 | Badoiu | G06F 40/169 715/230 |
| 2014/0215333 A1* | 7/2014 | Dhanyamraju | H04N 21/8455 715/716 |
| 2015/0067514 A1* | 3/2015 | Lewis | G06F 3/04817 715/720 |
| 2015/0147049 A1* | 5/2015 | Eronen | G06K 9/6293 386/285 |
| 2015/0181300 A1* | 6/2015 | Rajan | H04N 21/6143 725/58 |
| 2016/0100226 A1* | 4/2016 | Sadler | H04N 21/47217 725/38 |

* cited by examiner

For example:
1. Pay to activate
2. See an AD
3. Sign in as a member
4. Parent consent
5. A condition (e.g., a code, alphanumerical characters)

250 | Segment 1 | Segment 2 | Segment 3 | Segment 4 | ... | Segment N

Tag 254  Tag 256  Tag 252  Tag 258  Tag 260

FIG. 2F

```
{"appType": "author": "markType": "bookmarks", "marks_array":
[{"markName": "Intro", "videoFileName":
"http://youtu.be/LZ85i_LAPkw", "level":0, "t1":0, "t2":8.5, "nextBranchIx":1, "prevBranchIx":-1},
{"markName": "Left Hand Review", "videoFileName":
"http://youtu.be/LZ85i_LAPkw", "level":0, "t1":8.5, "t2":30.5, "nextBranchIx":2, "prevBranchIx":0},
{"markName": "Right Hand Study", "videoFileName":
"http://youtu.be/LZ85i_LAPkw", "level":0, "t1":30.5, "t2":31.82, "nextBranchIx":3, "prevBranchIx":1},
{"markName": "Right Hand study mode", "videoFileName":
"http://youtu.be/LZ85i_LAPkw", "level":1, "t1":31.82, "t2":66.473, "nextBranchIx":4, "prevBranchIx":2,
{"markName": "Legato Technique", "videoFileName":
"http://youtu.be/LZ85i_LAPkw", "level":1, "t1":66.473, "t2":68.869, "nextBranchIx":5, "prevBranchIx":3},
{"markName": "mark 1", "videoFileName":
"http://youtu.be/LZ85i_LAPkw", "level":1, "t1":68.869, "t2":79.309, "nextBranchIx":6, "prevBranchIx":4},
{"markName": "mark 9", "videoFileName":
"http://youtu.be/LZ85i_LAPkw", "level":2, "t1":79.309, "t2":86.715, "nextBranchIx":7, "prevBranchIx":5},
{"markName": "mark
10", "videoFileName": "http://youtu.be/LZ85i_LAPkw", "level":2, "t1":86.715, "t2":95.4, "nextBranchIx":8,
"prevBranchIx":6},
{"markName": "Right Hand Legato with Left Hand", "videoFileName":
"http://youtu.be/LZ85i_LAPkw", "level":1, "t1":95.4, "t2":96.758, "nextBranchIx":9, "prevBranchIx":7},
{"markName": "mark 1", "videoFileName":
"dxkvoLJ0Hqs", "level":0, "t1":96.758, "t2":115, "nextBranchIx":10, "prevBranchIx":8},
{"markName": "Putting Both Hands Together 2", "videoFileName":
"http://youtu.be/LZ85i_LAPkw", "level":0, "t1":115, "t2":129.422, "nextBranchIx":11, "prevBranchIx":9},
{"markName": "Putting Both Hands Together 3", "videoFileName":
"http://youtu.be/LZ85i_LAPkw", "level":0, "t1":129.422, "t2":130.656, {"markName": "mark 11", "videoFileName":
"http://youtu.be/LZ85i_LAPkw", "level":1, "t1":130.656, "t2":139.747, "nextBranchIx":12, "prevBranchIx":10},{"markName": "mark 12", "videoFileName":
"http://youtu.be/LZ85i_LAPkw", "level":1, "t1":139.747, "t2":152.896076,
"nextBranchIx":13, "prevBranchIx":11},{"markName", "level":2, "t1":152.896076,
"nextBranchIx":-1, "prevBranchIx":12}]}
```

*FIG. 3B*

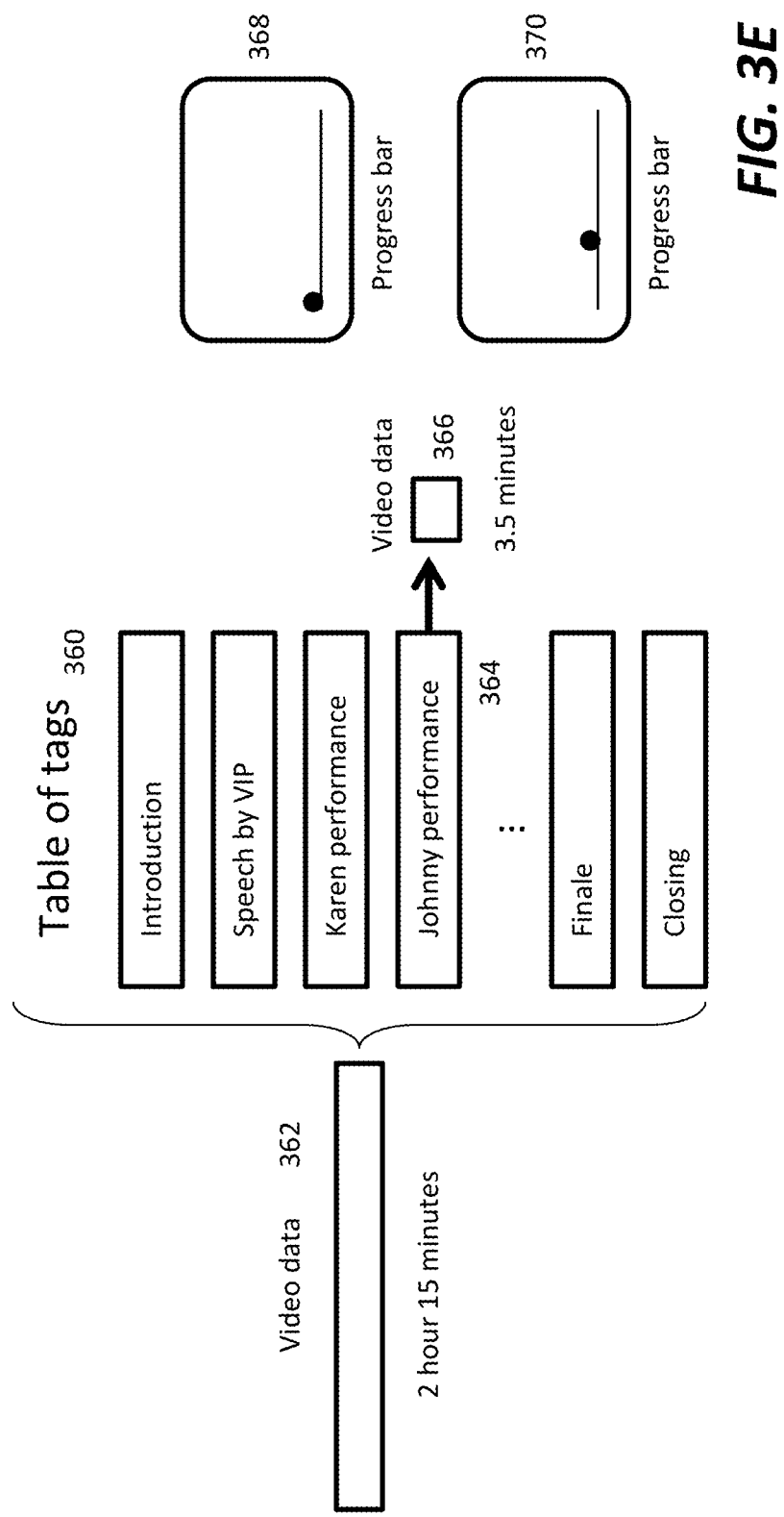

Table of tags for "cooking AND Asian"
372

- Sushi making — 373
- Prepare rice
- Rice selection
- ...
- InstantPot from AMAZON — 374
- How to make Orange Beef — 375
- Lunch Special at McDonald's — 376
- ...
- Finale

FIG. 3F

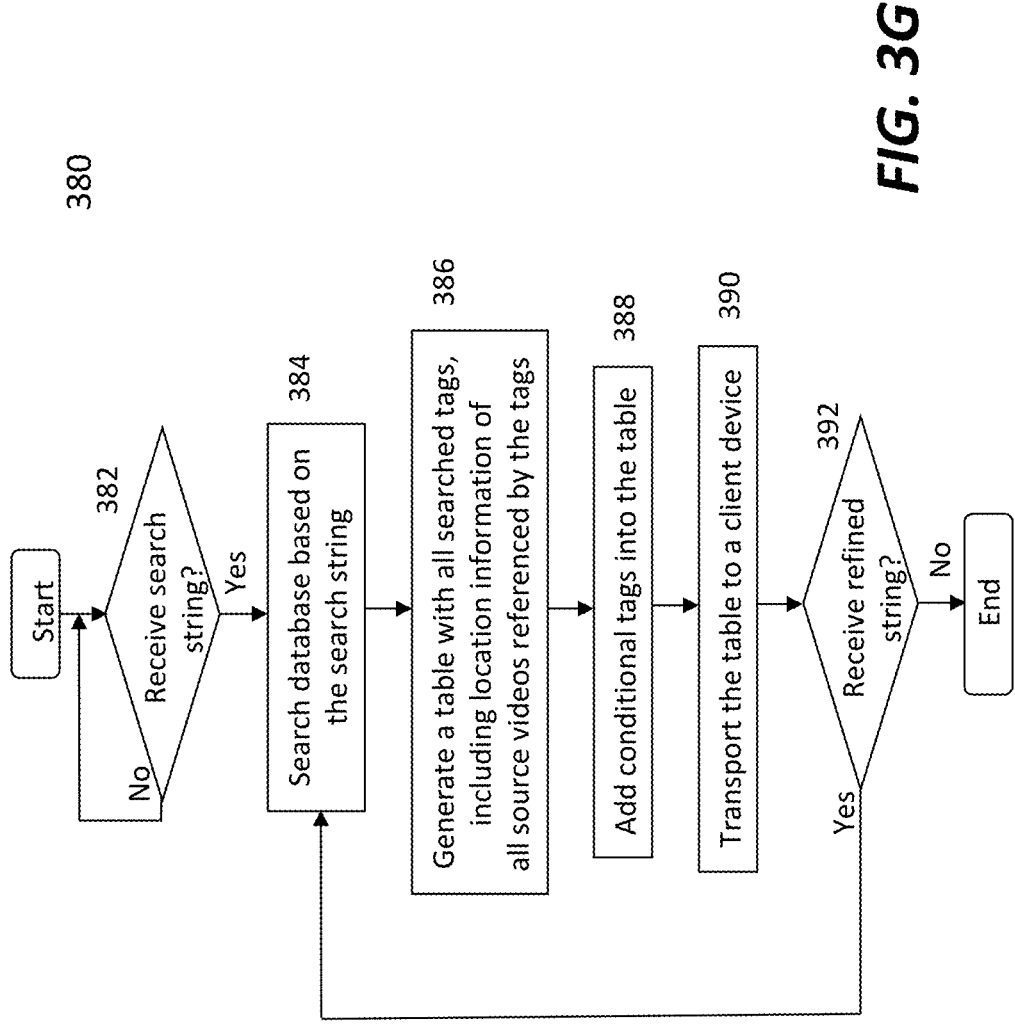

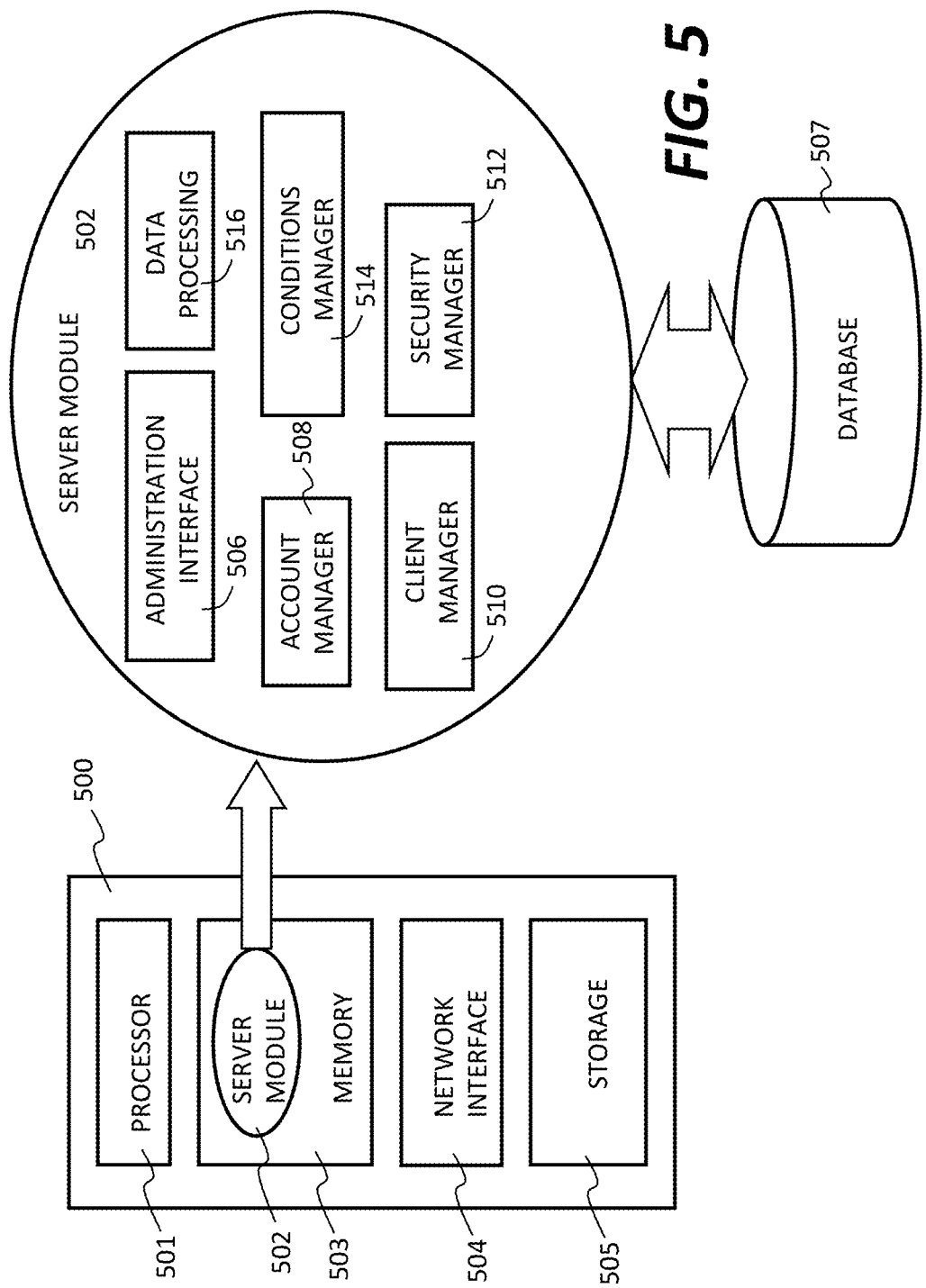

METHOD AND SYSTEM FOR SEGMENTING VIDEO WITHOUT TAMPERING VIDEO DATA

BACKGROUND OF THE INVENTION

Field of the Invention

The present invention is related to the area of man machine interface, and more particularly related to method and system for segmenting videos without modifying the video files, where the segmented videos may be shared with another user or among a circle of contacts over a data network (e.g., the Internet). Depending on implementation, a segmented video may include a list of tags or subtags, each corresponding to a defined portion or a segment of the video, where the tags or subtags are arranged in an order, not necessarily in time sequence, but preferred by an author, one or more of the tags may be used for an intended purpose (e.g., based on subscription, payment, advertisement or a type of consent).

Description of the Related Art

The Internet is a data communication network of interconnected computers and computer networks around the world and has been rapidly evolving to the point where it combines elements of telecommunications, computing, broadcasting, publishing, commerce, and information services into a revolutionary new business infrastructure. The economy on the Internet is growing in every aspect of life, from buying small items (e.g., stationary) to big items (e.g., vehicles and houses) to trading stocks and ordering services, all via the Internet.

The Internet is being relied upon as a medium for various communications, including audio, video, email and fax. Human communications may be conducted synchronously or asynchronously. Synchronous communication requires that both parties must be present at the time of the communication while asynchronous communication does not have such a requirement. For example, telephone is one type of synchronous communication while email is one type of asynchronous communication.

Asynchronous communication, including various discussion boards, blogging, and text messaging over the Internet, is becoming popular as it does not require both parties to be present when the communication takes place. Most of these asynchronous communication tools are meant to convey a subject or an idea in an electronic message. For example, as part of the asynchronous communication, electronic instructions provided by a business over the Internet can be accessed by a user whenever the user has time.

Such communication without two parties being present, however, requires clear and non-confusing expressions, otherwise a late-joined party would have no immediate way to clarify possible misunderstanding. In the domain of asynchronous communications, messages including images/video with audio are often used to illustrate a point or an idea. For example, www.youtube.com provides many teaching materials (e.g., installation guides and lessons) in video and images. Unless it is a simple procedure involving few parts, a video-based instruction would not help much as a novice user sometimes cannot even find a particular part in the video to follow along the instructions. Likewise, unless it is a simple subject, a video-based lecture would not make all students understand immediately without giving a student a time to review a particular section or providing additional teaching materials. Thus there is a great need for new ways to convey an idea in video.

To assist a viewer who may not have the patience to watch a video in its entirety, many video players are designed to provide a timeline to allow a viewer to jump to a specific section of the video. However, it is not easy to get to such a specific section by sliding a timer in the timeline, especially when the video is a data stream being streamed from a website (e.g., YouTube). Thus there is another need for ways to add relevant tags to certain sections of a video so that a viewer can jump to a relevant section of the view by selecting a tag.

A publisher of a video nevertheless wishes a viewer to view a published video in its entirety. Should a video be segmented by respective tags, some intended information in the video may be overlooked. Accordingly, there is another need for a publisher to control which part of a video must be viewed or parts of the video shall be viewed in a specific order.

There are many other needs that will become apparent upon examining the following detailed description of the present invention.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to segmenting a video using tags without interfering with video data thereof. According to one aspect of the present invention, each tag is created to define a portion of the video, wherein the tags can be modified, edited, looped, reordered or restored to a create an impression other than that if the video was played back sequentially. The tags are so structured in a table included in a tagging file that can be shared or published electronically or modified or updated by others.

According to another aspect of the present invention, one of the tags in the table may be made or a new tag may be inserted into the table as a conditional tag. The conditional tag requires an interaction from the user to clarify one or more conditions imposed on the conditional tag before subsequent tags can be activated. An example of the condition may include, but not be limited to, a password, a payment, a time to watch a separate video or visit a website, or a task to be finished by a user.

According to still another aspect of the present invention, the tags are not necessarily created for one source video. A table of tags may be created based on several source videos. For example, a group of first tags are related to a first source video and a group of second tags are related to a second source video, thus the tag table provides a mechanism to seamlessly concatenate two or more source videos while a viewer perceives it as if a single video source is being viewed.

According to still another aspect of the present invention, the tags are made searchable within a table or among a plurality of tables. To facilitate a viewer to look for videos related to an interested subject, labels for the tags or key words therefor are indexed. A search based on a keyword may lead to a generated table including all relevant tags to allow the viewer to view selectively any of the tags, where the tags defining corresponding video portions may be from one source video or several source videos.

According to yet another aspect of the present invention, whenever a table of tags is updated, an updated version thereof of a link thereto is deposited or published in a repository (e.g., a whitewall on a social network). As different users have modified the table over time, different versions are created and listed in an order and may be sorted according to when the versions were created, or names of those who have modified the booklet, lengths of the comments and etc.

The present invention may be implemented in software or in a combination of software and hardware, and practiced as a system, a process, or a method. According to one embodiment, the present invention is a method for creating a published video, the method comprises: loading a source video from a location where the source video is located; displaying the source video on a display of a computing device being used by a user; creating a plurality of tags in a table, each of the tags corresponding to a time duration to define a video portion of the source video to be associated with the each of the tags; allowing the user to reorder the tags in the table to impress a viewer in a way different from an impression of the source video sequentially played back, wherein each of the tags is activated by the viewer to view a corresponding video portion; and creating the published video by saving a file including the table of tags and a link to the source video. In one embodiment, a link to the file can be shared electronically via email, an electronic message, published in a webpage or other electronic means.

According to another embodiment, the present invention is a method for creating a published video, the method comprises loading a source video from a location where the source video is located; displaying the source video on a display of a computing device being used by a user; creating a plurality of tags in a table, each of the tags corresponding to a time duration to define a video portion of the source video to be associated with the each of the tags; allowing the user to reorder the tags in the table to impress a viewer in a way different from an impression of the source video when sequentially played back, wherein each of the tags is activated out of order by the viewer to view a corresponding video portion; and creating the published video by saving a file including the table of tags and a link to the source video. The published video includes a source video and the file, where the source video stays where it is and the file, when loaded, locates the source video so that a viewer can see a video in an order arranged by the user (or the author). Depending on implementation, the tags in table may be implemented with a progress bar thereon, superimposed on a graph or overlaid next to a graph. One of the tags may be conditional and turned off, skipped, removed, modified, updated, deactivated or become unconditional.

According to yet another embodiment, the present invention is a system for creating a published video, the system comprises a server configured to manage at least an account for a user, the account including a profile of the user and a file for a published video, wherein the file is created by the user with operations of: loading a source video from a location where the source video is located; displaying the source video on a display of a computing device being used by the user; creating a plurality of tags in a table, each of the tags corresponding to a time duration to define a video portion of the source video to be associated with the each of the tags; allowing the user to reorder the tags in the table to impress a viewer in a way different from an impression of the source video when sequentially played back, wherein each of the tags is activated out of order by the viewer to view a corresponding video portion; and creating the published video by saving the file including the table of tags and a link to the source video.

One of the objects, features, and advantages of the present invention is to provide an interactive interface for a user to view or listen to a relevant portion of a multimedia presentation.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2D shows underlying relationships of the respective tags in a table with corresponding segments in a video or videos;

FIG. 2E shows that a table has the same tags but reordered, a sequential playback per the table would create different impression on the viewers than the original table;

FIG. 2F shows a list of tags, one of which is shown differently from others, in one embodiment, the special tag is grayed in appearance;

FIG. 3B shows a portion of an exemplary tagging file;

FIG. 3E illustrates how a tag may be published alone;

FIG. 3F shows an exemplary generated table based on a search string "cooking AND Asian";

FIG. 3G shows a flowchart or process of generating a table based on a search string from a user;

FIG. 5 is a functional block diagram of a server machine or server in which a server module resides in a memory space and is executable by one or more processors.

DETAILED DESCRIPTION OF PREFERRED EMBODIMENTS

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention pertains to a platform, a service, and an application each of which is designed to allow a user to segment a video without modifying the video data thereof, where the video may be already in existence (e.g., streamed over the Internet) or created by the user him/herself. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context.

The invention is related to multimedia presentations such as video or audio presentations, but will be described herein mainly based on videos. Those skilled in the art shall understand that many embodiments described herein are equally applicable when a video is replaced by an audio. Additionally as used herein, a source or source video means that a video streaming or file that can be played back in its original form or sequence in an application (e.g., a video player). A published video means that the video can be played back out with tags allowing a viewer to view any part of the video without having to follow the original form or sequence. One of the benefits, advantages and objectives in the present invention is that the data in a video streaming or file is not altered or interfered with when the video is segmented.

Figure 1A:
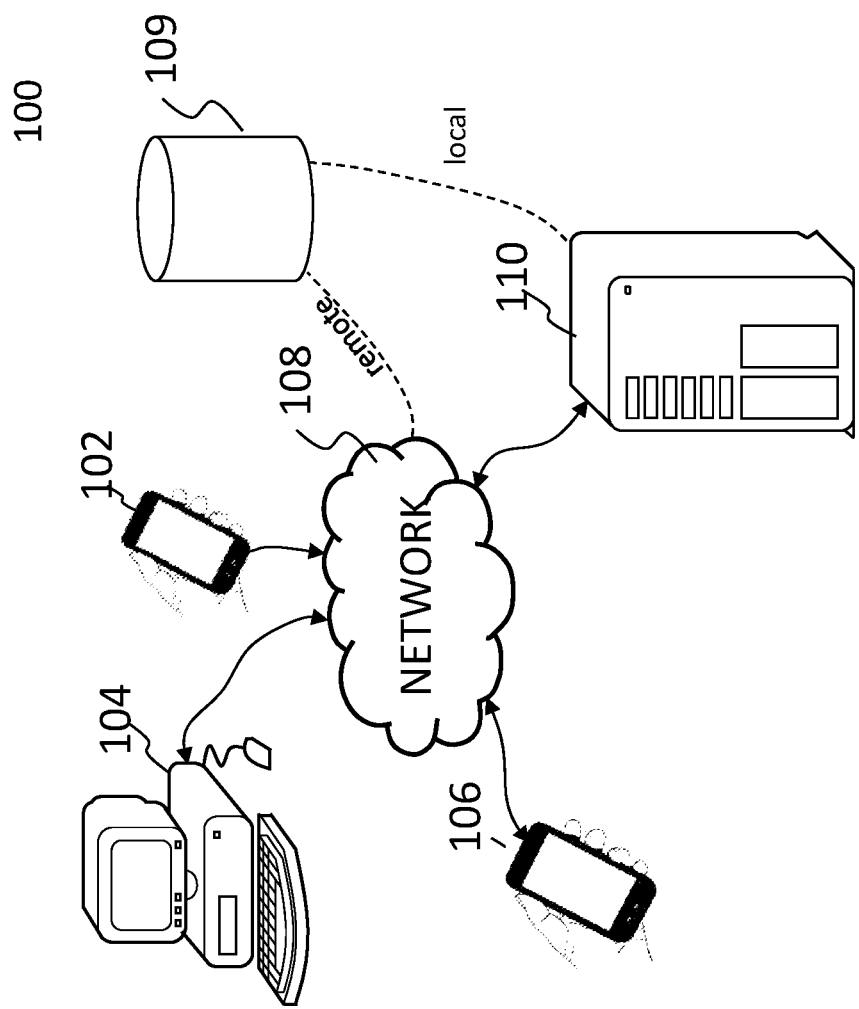
FIG. 1A shows a basic system configuration in which the present invention may be practiced in accordance with one embodiment thereof.

Referring now to the drawings, in which like numerals refer to like parts throughout the several views. FIG. 1A shows a basic system configuration 100 in which the present invention may be practiced in accordance with one embodiment thereof. FIG. 1A shows that there are three representative computing devices 102, 104 and 106, where the device 102 or 106 is meant to be a mobile device (e.g., a wearable device, a smart phone, a tablet or a laptop) while the device 104 is meant to represent a stationary device (e.g., a desktop computer). Each of the devices 102, 104 and 106 is coupled to a data network 108, an example of the network 108 may be, but not limited to, the Internet, the Intranet, or a wireless and/or wired network.

In one embodiment, one of the devices 102, 104 and 106 is used to segment a video provided by a source 109 that is also coupled to the network 108. An example of the source 109 may include, but not be limited to, a website (e.g., www.youtube.com) on the Internet, a video server or a data source. As the name suggests, the source 109 is provided to host at least a video file for others to access. In one example, the source 109 is provided to supply various videos that may include, but be limited to, movies, lessons, installation guides, advertisements and various video footages. Each of the videos is identified or located by a link (e.g., universal resource locator or URL).

A server 110 is hosted by a service provider offering tools for a user to segment a video from the source 109. Depending on implantation, the service provider may offer an authoring tool or an application to allow a user to segment a video. As will be further described below, the server 110 is provided to store a file per the video under a user account so that a published video can be accessed in a way preferred by a viewer via a selected tag or in a sequence organized by the user (author) via a series of tags. It should be noted that the file is stored in one place and the video (i.e., source video) stays where it is originally located. In other words, the video data of the source video is never interfered with when creating the published video.

According to one embodiment, the service provider maintains a plurality of accounts, each account includes a profile of a user and a list of files created by the user, where each file or more than one file are created per a video. According to one embodiment, a file includes a link to the video and a set of descriptors. The link dictates where the video shall be loaded from. Each of the descriptors describes a label or a tag for a segment, for example, where the segment starts and ends, or special features of the tag (unconditional or conditional accessible). The file is interchangeably referred herein as a tagging file or a mapping file. As will be further described below, all the tags created by a user can be structured in a linear list or in hierarchy. It should be noted that a published video is so created when a corresponding tagging file is created therefor.

In operation, when a viewer desires to access a published video, a link in the tagging file is provided to locate and load in the video. Under the guidance of the tags, the video can be accessed starting a portion therein via a tag or in a specific order specified by the tags, where the specific order is not necessarily sequential in time. For example, a published video may be started at timeline of 20:30 for 9 minutes, followed at timeline of 10:19 for 4.75 minutes and then repeated twice at timeline of 41:24 for 3.5 minutes. Regardless how the published video is played back, the data in the original video stream or file is not altered. In other words, the video provided at the source 109 remains the same and the data thereof is untouched or not interfered with.

The published video may be shared via the network 108 with a viewer with a playback device. Such a playback device may be a computing device. An example of the computing device is a desktop computer or a portable device (e.g., smartphone or tablet). According to one embodiment, the playback device includes a touch-screen display, as most of the mobile devices do. Although other man-machine interfaces are possible, a touch-screen display provides the convenience for a user to activate a tag for a defined portion in a video. Similarly, such a playback device can also be used to edit a table of tags (e.g., creating new tags, delete/ modify existing tags and/or their specific features if needed), and save the tags into his own account on the server 110 as if the user has created a published video on his own, and publish it on the Internet or share it with his contacts.

As described above, the server 110 is provided to administrate an authoring tool to allow its users to create a published video while maintaining user accounts. In one embodiment, the server 110 is implemented to analyze the context of the video, the created table of tags in accordance with the profile of the user to extract some keywords. At a predefined time, one or more corresponding advertisements are embedded into the table, causing a viewer to activate a tag that brings up an advertisement for the viewer to see.

In one example, a user enjoys a video footage related to cooking but is not satisfied with the way the cooking procedure is being presented. The user creates a table of tags, each of the tags shows a portion of the video footage. With all the tags, the video footage can be played back out of its original sequence or in a way preferred by the user. Once the tagging file is saved, the sever 110 is configured to determine from the file that a cooking related advertisement may be appropriate for the published footage. In one embodiment, the table is modified to be inserted with a special tag. After the video footage is shared with or accessed by a viewer, the video footage is played back with the modified table. When the special tag is activated, a corresponding advertisement video is played back, or a browser is launched with necessary information automatically filled to bring the viewer right onto a product or service being featured in the advertisement.

In view of advertising through a video stream such as those commonly seen on Youtube, those skilled in the art may appreciate that the advertisement delivery using a table of tags is much more efficient in the present invention because an advertisement is made to be linked to a special tag, where the advertisement may be updated by a service provider anytime. Further one or more tags for a specific video or their orders or positions may be auctioned among the those that want to put out their advertisements at a specific time or date. Operationally, one or more, and various advertisements can be delivered through special tags without interfering with the video data.

In one example of an audio presentation, a public company is required to release a quarterly earnings report, which is generally conducted in live and broadcast in audio to shareholders and analysts. Such a release is also made available online for others to access whenever they want. One embodiment of the present invention can be advantageously used to tag a recording of the release by adding various tags, each tag corresponding to a subject of interest. For example, one tag points to the financial numbers (e.g., revenue, costs and profits or loss), another tag points to major events happened in the quarter, and yet another tag points to the management outlook of the following quarter or the remaining of the fiscal year. As a result, a shareholder or an analyst may still obtain the important parts of the quarterly earnings report by activating relevant tags for the corresponding audio portions without having to listening to the release in entirety.

Figure 1B:
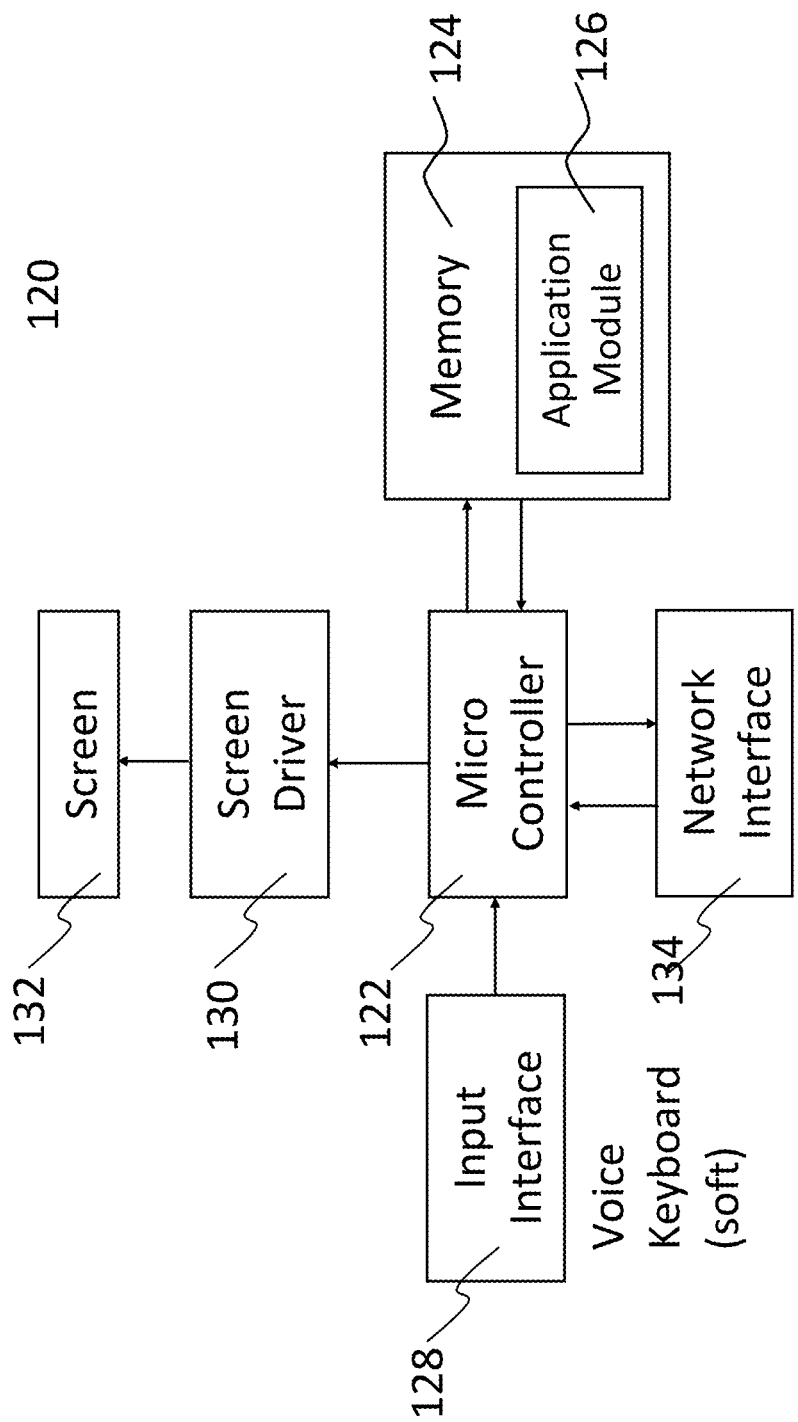
FIG. 1B illustrates an internal functional block diagram of a computing device that may be used in FIG. 1A.

Referring now to FIG. 1B, it illustrates an internal functional block diagram 120 of a computing device that may be used in FIG. 1A. The computing device includes a microprocessor or microcontroller 122, a memory space 124 in which there is an application module 126, an input interface, a screen driver 130 to drive a display screen 132 and a network interface. The application module 126 is a software version representing one embodiment of the present invention, and downloadable over a network from a library (e.g., Apple Store) or a designated server (e.g., the server 110 of FIG. 1A).

The input interface 128 includes one or more input mechanisms. A user may use an input mechanism to interact with the device 120 by entering a command to the microcontroller 122. Examples of the input mechanisms include a microphone or mic to receive an audio command and a keyboard (e.g., a displayed soft keyboard) or a touch screen to receive a command. Another example of an input mechanism is a camera provided to capture a photo or video, where the data for the photo or video is stored in the device for immediate or subsequent use with the application module 126. The driver 130, coupled to the microcontroller 122, is provided to take instructions therefrom to drive the display screen 132. In one embodiment, the driver 130 is caused to drive the display screen 132 to display a photo or a video. The network interface 134 is provided to allow the device 120 to communicate with other devices via a designated medium (e.g., a data network).

According to one implementation, the application module 126 is loaded in the memory 124 and executed by the controller 122 for a user to create a published video. As will be further described below, the published video is created under the execution of the application module 126, and progressed with inputs/tags from the user via the input mechanism 128. Once finished, a tagging file is created for the video, hence a published video. The application module 126 is configured to allow the user to share the published video on a designated website (e.g., a whitewall on www.facebook.com) or a designated user. In one embodiment, a presentation in a markup language represents the published video is shared. When the presentation is accessed by a viewer, the presentation is loaded in a browser that is caused to retrieve the video and the tagging file to playback the published video.

In a similar fashion, the device 120 may be used to receive a published video from an original author or another user via the network interface 134. According to one embodiment, a published video being viewed may be enhanced or updated by modifying existing tags (rewording existing tags, deleting or adding additional tags). An updated tagging file is created and may be saved or shared. Again the published video can be shared with others via the network interface 134.

Figure 2A:
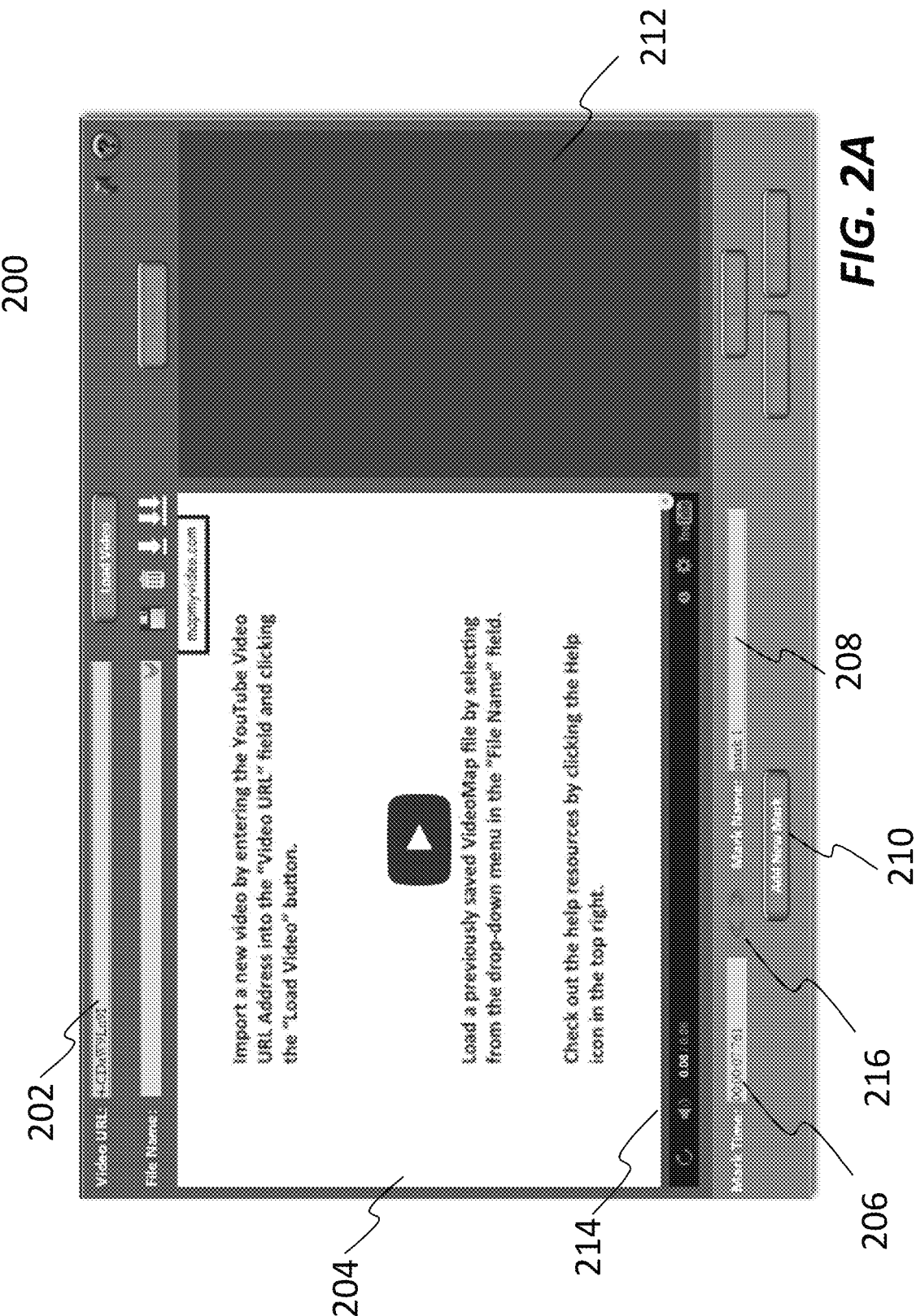
FIG. 2A shows an exemplary interface of an authoring tool according to one embodiment of the present invention.

Referring now to FIG. 2A, it shows an exemplary interface 200 of an authoring tool according to one embodiment of the present invention. Depending on implementation, the interface 200 may be generated from an application module or implemented in a programming language (e.g., JAVA, C++, Javascript) and presented in a browser. The interface or display 200 is an example from which tags or a table may be created, according to one embodiment of the present invention. The display 200 shows an entry 202 designed to allow a user or an author to input a link to a video source. If the video is locally stored, the author can guide the entry 202 to where the video is stored locally (e.g., a memory space or a folder). If the video is remotely stored, a URL of the video can be pasted into the entry 202. For example, the video is available on www.youtube.com, the URL of the video at www.youtube.com can be copied and pasted onto the entry 202. Once the video is located and streamed in, the video can be played back in the window 204 of the interface 200. In a perspective, the display 200 is also a playback interface or part of a video playback module.

When creating a tag, the display 200 is designed to allow an author to make a starting time 206 of the tag. Although not specially shown in FIG. 2A, the display 200 is designed to allow the author to specify the ending time for the tag. In other words, the display 200 provides a mechanism to specify when a specified portion of the video shall be started (t1) and when it shall be ended (t2), hence the length of the portion specified by the tag is t2−t1. Should t2 not be provided as shown in FIG. 2A, by default, t2 will be assigned to be the beginning of the next tag.

A name place 208 is provided to name the tag. For example, the author desires to name the tag as "Must see first", when a viewer sees a table with many tags, the viewer may activate the tag labeled as "Must see first". When a button or "Add new mark" 210 is activated, the tag is added to a window 212 for displaying the table.

The display 200 provides a timeline 214 to allow the author to slide the start of the video to a specified time. However, it is practically difficult to know exactly when a specified portion shall be started or ended. A pair 216 of manual forward and backward is provided to allow the author to specify a frame to start or end, so as to get a fairly exact time for the start and/or end time of the tag. Depending on implementation, the pair 216 of manual forward and backward may be implemented at a predefined time period (e.g., 0.01 second) or based on a video frame.

Figure 2B:
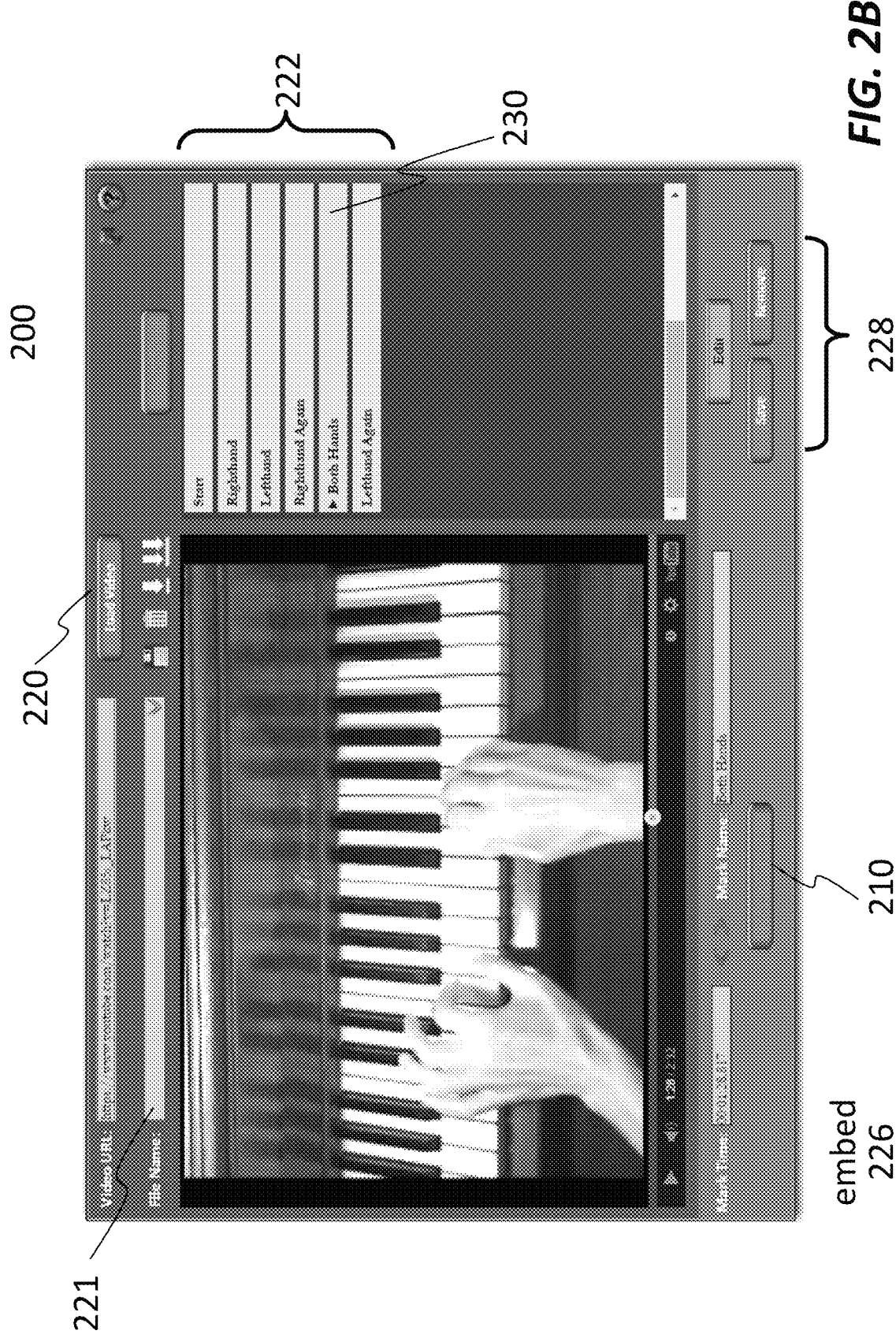
FIG. 2B is an sample display showing that a piano lesson video is being segmented or tagged.

Referring now to FIG. 2B, as an example, the display 200 shows that a piano lesson video is being segmented or tagged. The source video is originally available at YouTube. Once the link to the source video is copied and pasted into the entry 202 in the display 200. An underlying module of the display 200 is caused to retrieve the source video from YouTube upon "Load video" 220 being activated. As the link is directly related to the video, an advertisement preview that is often played on the YouTube video player prior to playing back the actual video would not come to the authoring tool or the display 200. In order words, an advertisement video (allowed to be skipped after a few seconds) that would be shown first when the same video is viewed on the YouTube website will not be delivered into the authoring tool or the display 200.

A table 222 shows that there are five tags made to the piano lesson video. The five tags in a table 222 are respectively labeled as:
Righthand
Lefthand
Righthand Again
Both Hands
Lefthand Again
As the name suggests, each of the tags defines a portion of the piano lesson based on the play of a hand or both hands. The tagging file can be named specifically at entry 221, and saved to a predefined location. In one embodiment, the tagging file is saved on the server 110 of FIG. 1A and associated with a user account. As will be further discussed below, a final saved tagging file can be updated, modified by others or shared with others.

According to one embodiment, a mechanism labeled "embed" 226 is provided to allow the user to share the published video with another user. The mechanism 226 provides a link to a playback file. In one embodiment, the playback file is an HTML file. When the link is copied to a webpage, the display 200 will be embedded in the webpage, allowing anyone accessing the webpage to play back the published video. Similarly, the link may be also embedded in a webpage for publication, a modified version thereof may be emailed or texted to another user or published on a whitewall in a social network. Once the link is received and activated, the viewer is shown the display 200 of FIG. 2B and allowed to view any of the portions in the piano lesson by one of the tags or in the order of the tags structured in the table 222 by activating "start".

In one embodiment, the display 200 is designed to provide an interface 228 to allow a user (e.g., a viewer) to modify the tags in the table 222. As shown in FIG. 2B, the interface 228 includes three buttons, "edit", "Save" and "Remove". As the names suggest, together with "Add new mark" 210, one or more of the tags in the table 222 can be removed and renamed, and further new tags can be added therein. By saving the tagging file at the entry 221, the user now has his own tagging file for the same source video.

Figure 2C:
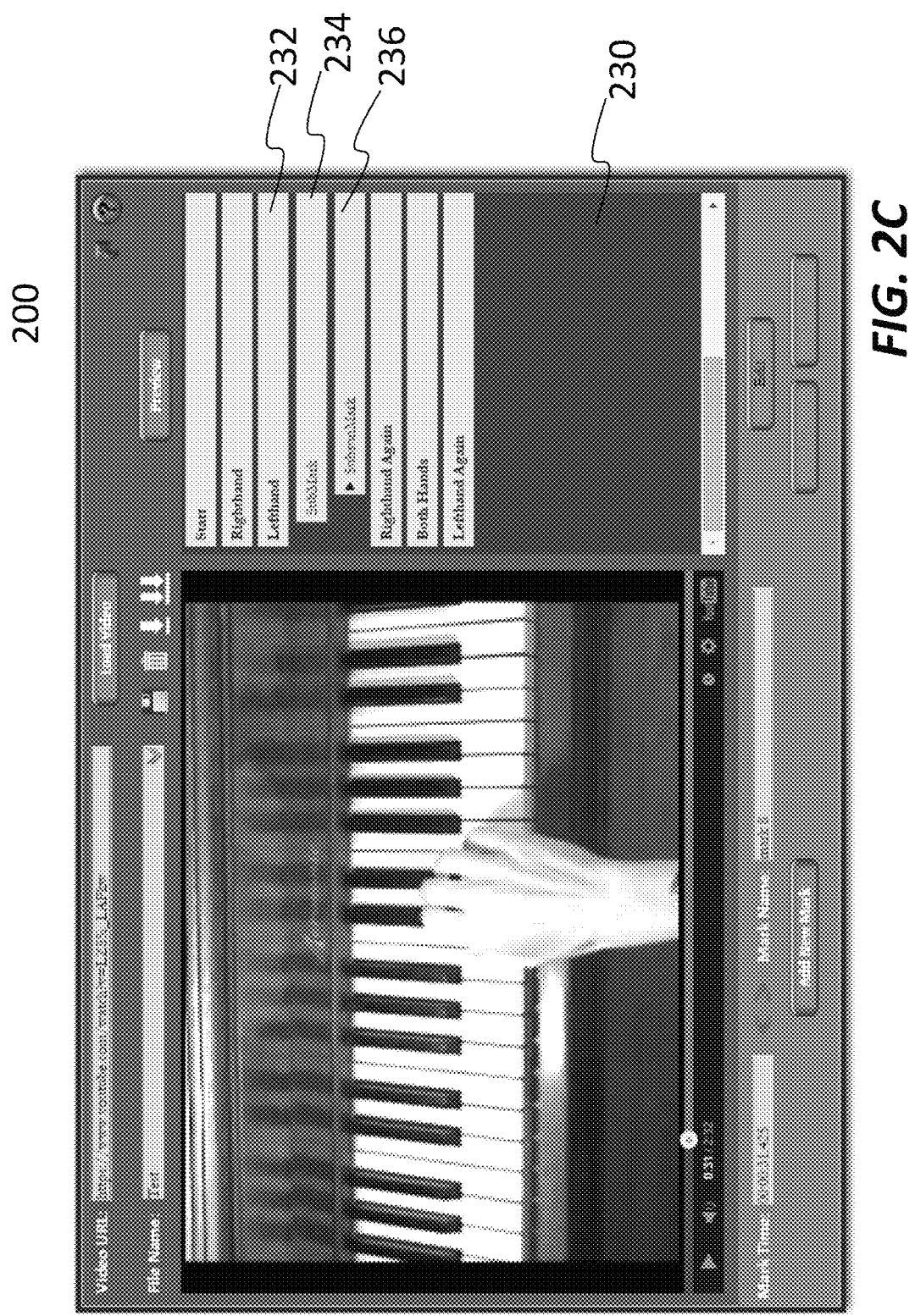
FIG. 2C shows an example of a table having a tag with a subtag that has its own subtag, hence a subsubtag for the tag.

According to one embodiment, each of the tags in the table 222 can have one or more subtags. The starting and ending times for each of the subtags are preferably limited within the starting and ending times of the (parent) tag although it is possible to have a subtag without such restriction. In addition, each of the tags or subtags may be defined to be overlapping if needed. FIG. 2C shows an example of a table 230 having a tag 232 with a subtag 234 that has its own subtag, hence subsubtag 236.

Referring now to FIG. 2D, it shows underlying relationships of the respective tags in a table 240 with corresponding segments in a video or videos. As an example, the table 240 shows a hierarchal relationship of the video segments (tags). It is assumed that a first video is retrieved and segmented with a first tag 242 to define a (first) video portion starting at t1 and ending at t2. As a result, when the first tag 242 is activated, the first video portion is started right at t1 and ended at t2. It is now deemed necessary to further segment the first video portion defined by the first tag 242 with a subtag 244. The subtag 244 defines a smaller video portion within the first video portion. From a viewer perspective, the viewer can skip some of the first video portion and view directly the smaller video portion to get to his interested portion. Should there be a need to further segment the smaller video portion, a subtag 246 of the subtag 244 can be created to define even smaller video portion within the already smaller video portion defined by the subtag 244. In theory, there is no limit as so how many levels of the hierarchy can be defined. Also in theory, the subtag 246 may define a portion of a video going beyond the time limit t2−t1.

One of the important features, advantages and objectives in the present invention is the seamless concatenation of several source videos. For example, an author needs several video sources to generate an extracted video. Instead of getting all these video sources and editing each to produce the extracted video, the author can use one embodiment of the present invention to create the extracted video without interfering with the video data of each of the source videos. The table 240 shows that the second tag 248 is related to another (second) source video. In other words, the first tag 242 is defining the first video portion in the first source video and the second tag 248 is now defining a video portion in the second source video. When the table 240 is activated from the start, the first video portion of the first source video is played back and the video portion of the second source video is seamlessly switched on right after the subtag 246 is finished. When a viewer selects a "play" button or a very first tag to start a published video, the tags in the table 240 are sequentially and automatically activated. When a video portion is being played back, the corresponding tag is highlighted to demonstrate that the particular tag is being active.

As described above, a tag defines a video portion of a source video. According to one embodiment, when the table 240 includes a plurality of tags, the order of the tags can be reordered or shuffled in an order defined by a user. FIG. 2E shows that a table 242 has the same tags but reordered. A sequential playback per the table 242 would create different impression on the viewers than that per the table 240. If needed, one or more video segments may be repeated in a specific order or looped for a specific number of times as shown as a sign 245. In one embodiment, the tag may be implemented in a different appearance than other non-looped tags, for example, with a number superimposed on the tag, where the number indicates the remaining times the particular video segment has to be played or viewed.

FIG. 2F shows a list of tags 250 one of which 252 is different from others. In one embodiment, the special tag 252 is grayed in appearance. Depending on implementation, the grayed tag 252 may be added by an author or a service provider. For example, a child is instructed to view a video published by his parents. To avoid the child being confused or to see some improper content in the video, the source video is segmented to hide a video portion defined by the tag 252. When the published video is played back, the segments 254 and 256 are sequentially shown, the video is paused at the segment 252. Depending on implementation, the pause may be designed to require a passcode to activate the segment 252 or skip the segment 252 after a predefined period so that the child only sees what his parents consent with.

According to another embodiment, the tag 252 is inserted by a service provider to invite a viewer to view the content defined by the tag 252 upon a condition being met. For example, a movie distributor allows a viewer to view a portion of a new release but block most of the release by the tag. The portion of the release does not have to be the beginning part of the release. The rest of the release may be protected by one or more tags defining collectively the rest of the release. When the viewer views the portion that ends at one of the tags (e.g., the tag 256), the viewer is required to follow up with a requirement embedded in the tag 252 before the tag 252 can be activated to show the corresponding portion of the release. Depending on implementation, the requirement may be a payment to the movie distributor, a promotion code, or a view of an advertisement. This example illustrates the flexibility of using tags to control the access to certain portions of a source video.

According to yet another embodiment, the tag 252 is inserted by a service provider to invite a viewer to view the content defined by the tag 252 upon a condition being met. For example, the viewer is required to view an advertisement directed by the tag 252 before the subsequent tags are activated or allowed to be selected. After the viewer views the advertisement for a predefined time (e.g., 10 seconds), the tag 252 is activated to allow the playback to continue to the next tag 258.

To facilitate the description of the present invention, the tag 252 is described as grayed. Those skilled in the art may understand that such a tag 252 may not be really in gray and can be highlighted in any way that makes a sense to a viewer. When a tag is grayed, it means that the tag can be activated upon a condition being met. One of the purposes of such a tag is to get attention from the viewer thereto before being skipped. In one embodiment, such a "grayed" tag is in a color different from the color of other tags. In another embodiment, such a "grayed" tag is labeled differently.

Figure 3A:
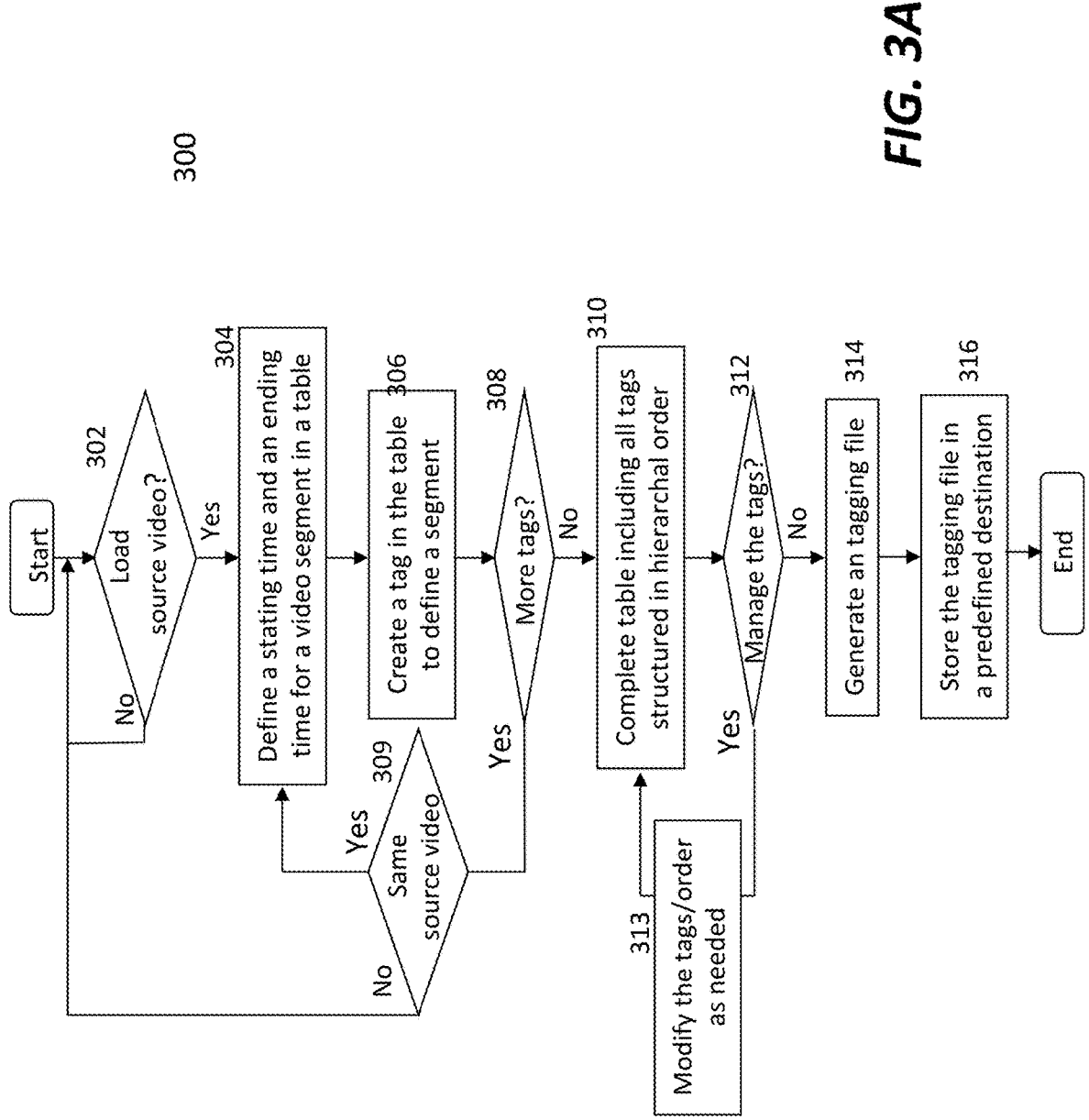
FIG. 3A shows a flowchart or process of creating a tagging file or a published video according to one embodiment of the present invention.

Referring now to FIG. 3A, it shows a flowchart or process 300 of creating a tagging file or a published video according to one embodiment of the present invention. Depending on implementation, the process 300 may be implemented in software or a combination of software and hardware. The process 300 may be better understood in conjunction with previous figures and is initiated when an application module implementing the embodiment is activated or an authoring tool provided by a server (e.g., a server 110 of FIG. 1A) is loaded in a browser. In the following description of the process 300, it is assumed that a user uses a browser to access his account, from which the user is permitted to author a source video for a purpose (e.g., archival, sharing, distribution or publication).

A user is instructed to provide the location information of the source video at 302. An example of the location information may be a URL, a folder or repository in a local or remote computing device. The process 300 is started when the source video is located and retrieved into the authoring tool as shown in FIG. 2A. At 304, the user defines where to start and end a segment. Essentially, a starting time and an ending time in a video timeline define a portion or segment of the source video. According to one embodiment, the ending time is set by default the ending time of the entire source video. When a next tag is defined, the ending of the previous tag is set to be the starting time of the next tag. This approach ensures that no video portion would be left undefined in a tag. In another embodiment, the ending time for a segment is manually determined by the user, in which case there is a chance that some of the video portion may be skipped or repeated (looped). FIG. 2A shows a corresponding embodiment in which the display 200 does not require the user to specify an ending time. Nevertheless, at 306, a tag is created in a table that includes a starting time and an ending time for a portion being identified. Initially, the table is empty and gradually populated with tags and subtags, if there are any, as the process 300 goes through 306 repeatedly. Not specifically shown in FIG. 3A, the tag may be made as a conditional tag in one embodiment. As another representation of a grayed tag, a conditional tag preferably shown differently from other tags needs to be activated differently from other tags.

The process 300 continues to 308, where the process 300 determines if the user needs to create more tags (or subtags) of an already created tag for the source video or a new tag for another video(s) at 309. As described above, tags are utilized to seamlessly switch from one portion in one source video to another portion in another source video. Should the user determine to have another tag for a portion in another video, the process 300 goes to 302 to load a different video. Should the user determine to have another tag for a portion in the same source video, the process 300 goes to 304 for the user to define a new tag for a different portion of the source video being already loaded.

When the user is done with creating all the tags, the process 300 goes on to 310, where the table including all the tags is finished. Initially, the tags may be in an order as they were created. At 312, the user determines if the order is what he wants. Operationally, the order essentially allows all the video portions defined by the tags are sequentially played back per the order of the tags. As shown in FIG. 2B, all the tags are sequentially activated if a viewer simply starts the published video from start, where a tag 236 is highlighted when the corresponding video portion is being played back.

It is now assumed that the user needs to manage the tags according to a purpose by the user. The process 300 goes to 313, where the user rearranges the tags or adds new tags. As shown in FIG. 2E, the order of the tags is changed along with any subtags if they exist. According to one embodiment, the user desires to make one of the tags or manually add a new tag as a conditional tag. A condition has to be entered per the tag. Depending on implementation, there are different ways to accept an input to check if the condition is met before activating a conditional tag.

According to one embodiment, a webpage (e.g., implemented in HTML) is launched to require an input from a viewer. Upon receiving the input, the webpage coupled to the server 110 of FIG. 1A transports the input to the server for verification. Should the input be acceptable, the tagging file is updated to unlock the conditional tag so that the video portion defined by the conditional tag is played back as normal. Should the input not be acceptable, the video portion defined by the conditional tag is skipped as if the source video does not have that portion, consequently the viewer does not see it. The application of the conditional tag is useful when a publisher desires to get something from a viewer in return for providing the published video for viewing.

According to another embodiment, the conditional tag is modified to include a website with necessary information to promote a product or a service. When playing back, the tag causes a website automatically filled necessary information to show the promoted product or service so that the viewer may enter a transaction with the website regarding the promoted product or service.

According to yet another embodiment, the conditional tag requires a condition to be fulfilled by a viewer. Without inherent limitations, the condition may be designed to pop up a window or a separate website to receive an input from the viewer or show a promotion video. Those skilled may think of various ways to fulfill a condition for the conditional tag to be turned off, skipped, removed, modified, updated or deactivated, without departing from the principle of the present invention.

Returning now back to FIG. 3A, the user is done with the management of the tags at 312. The process 300 now goes to 314 to save a tagging file. FIG. 3B shows a portion of an exemplary tagging file according to one embodiment. Those skilled in the art shall understand that there are different ways to implement such a tagging file without departing from the principle of the present invention.

Figure 3C:
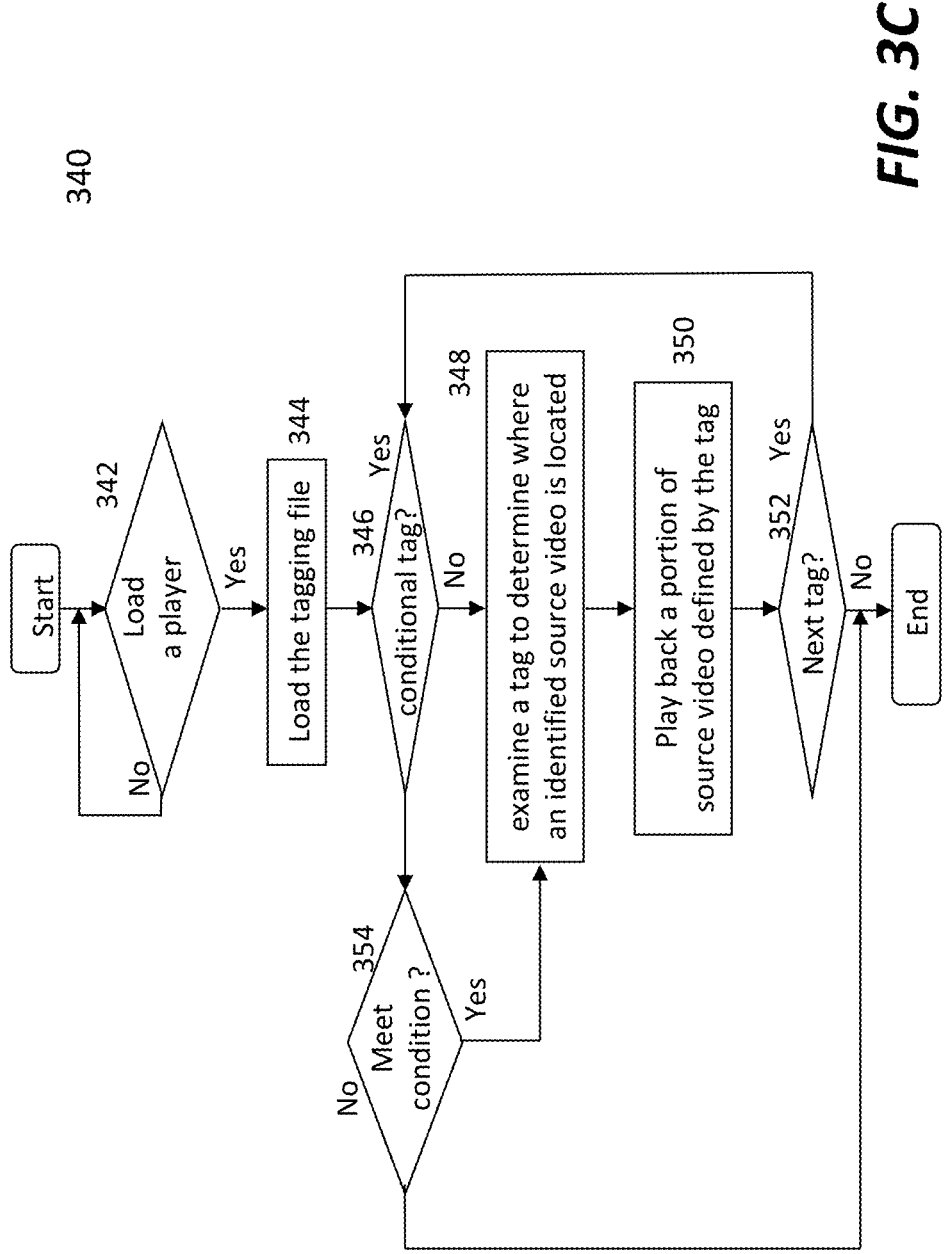
FIG. 3C shows a flowchart or process of playing back a published video according to one embodiment of the present invention.

FIG. 3C shows a flowchart or process 340 of playing back a published video according to one embodiment of the present invention. Depending on implementation, the process 340 may be implemented in software or a combination of software and hardware. The process 340 may be better understood in conjunction with previous figures and is initiated when a player of the published video is loaded.

According to one embodiment, when a tagging file is created in an authoring tool in a display shown in a browser, a link representing the display, as shown in FIG. 2A or FIG. 2B, can be transported in email, a webpage, an instant message, or other electronic means, to another user or a viewer. When received, the viewer activates the link, a computing device being used by the viewer retrieves data representing the display. As a result, the computing device shows the published video, allowing the viewer to start the tags sequentially or select any one of the tags to immediately view a corresponding video portion. Depending on the relationship between the viewer with the service provider, the viewer may only view the video or be provided with the privilege to modify the tags and create a tagging file as if the user has just published a video.

In any case, at 342, it is assumed that such a display is successfully loaded and displayed. A tagging file is then loaded at 344 to allow the viewer to play back the published video. The user may choose a tag to start the playback or simply start the playback sequentially per the order of tags.

At 346, each tag in turn is examined to determine if it is conditional. When the tag is a regular one (unconditional), the process 340 goes on to 348 to determine the source of the video. The video can be the same one already loaded at 344 or a new one identified by a URL in the tag. At 350, the video portion defined by the tag is played back. At 352, a next tag is met. The process 340 now goes back to 346 to determine if the tag is conditional or not.

Referring now to 346, it is assumed that the tag is conditional, that means a user has to do something to satisfy a condition embedded in the tag. The process 340 now goes to 354 to determine whether the condition is met or not. According to one embodiment, the condition for the tag is to request the viewer to watch a commercial video for 5 seconds. The tag is turned into unconditional after the commercial video is watched for more than 5 seconds so that the process 340 now goes to 348 which has been explained above. According to another embodiment, the condition for the tag is to request a password, the tag is turned into unconditional after a correct password is entered.

According to still another embodiment, the condition for the tag is to perform a process with a designated server, where the designated server is identified by a URL embedded in the tag. When the conditional tag is activated, the computing device is caused to establish a connection with the server so that some data exchanges take place. In one case, an electronic payment by credit card or mobile payment is entered on the computing device, the data representing the amount or payment information is received at the server. The server acknowledges the payment by sending back a code that cause the computing device to turn the condition tag into unconditional so that the process 340 now goes to 348 which has been explained above. In any case, if the condition for the conditional tag is not met at 354, the process 340 ends or skips some tags to lead the viewer to another tag.

Figure 3D:
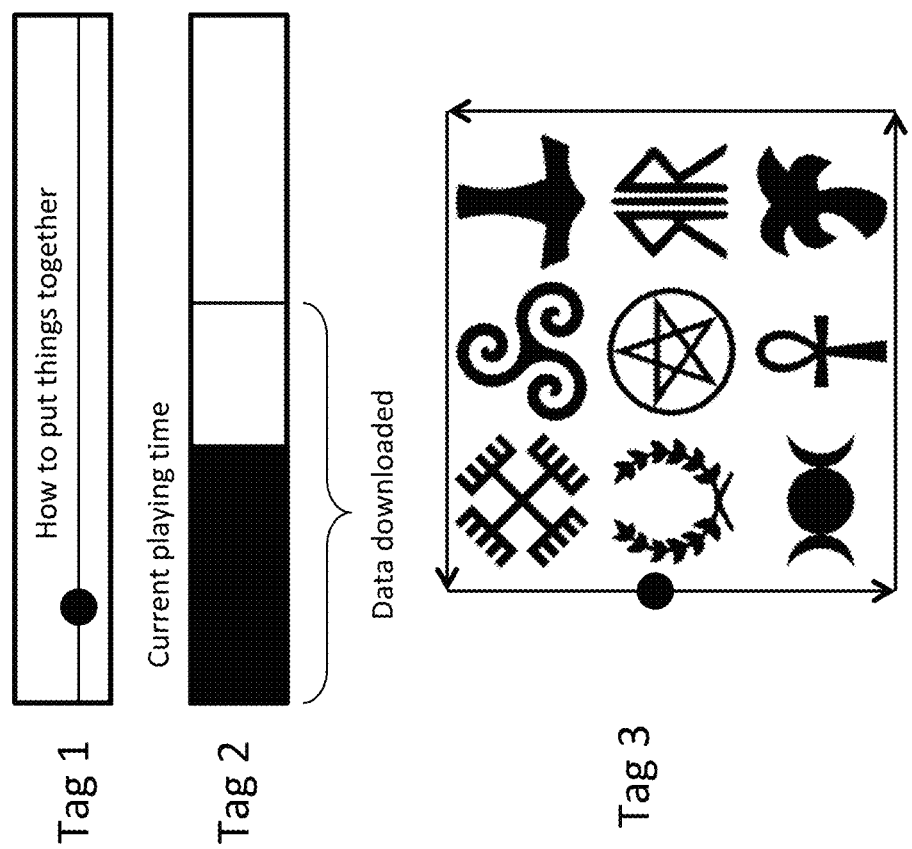
FIG. 3D shows some examples of the tags that may be further animated, graphed or overlaid on a message, a graph or a symbol.

FIG. 2B or FIG. 2C shows that each of the tags is labeled so that a viewer knows which tag is to be selected to view the corresponding video portion. FIG. 3D shows some examples of the tags that may be further animated, graphed or overlaid on a message, a graph or a symbol. Tag 1 shows that a time line may be implemented thereon besides a wording label so that a viewer is aware of the progress of playing back the corresponding video portion. Tag 2 shows another implementation of showing a progress bar on top of a tag, which is only shown when the tag has been selected and started. Tag 2 may be useful when the video portion is from a streaming source so that the viewer may see how much video data has been downloaded ahead of the current playing time, where the playing time is defined to be the time that the tag or the corresponding video has been played back. Tag 3 is shown that a tag is being overlaid upon a graph. As the video portion is being played back, the progress indicator moves around the graph to indicate which sign or symbol is being indicated. In general, the progress indicator moves linearly. As will be further described below, there are certain cases, the indicator may be caused to move nonlinearly for a selected portion of the segmented video to appear synchronized with certain marks or symbols that may be placed unevenly between each other.

According to one embodiment, each tag may be shared with others or published on a website. For example, there is a long video covering an event. A user hopes to share a specific portion of the video with a relevant contact. While segmenting the video with a number of tags, a tag defining the specific portion may be labeled as "you must see" or something that may draw attention from the contact, the tag itself may be shared with the contact, in which case the contact will view the specific portion of the video upon activating the tag.

Referring now to FIG. 3E, it illustrates how a tag may be published alone. It is assumed that a user has authored a table of tags 260 for a performance video that lasts over 2 hour 15 minutes. Each of the tags in the table 260 has been properly labeled. The author desires to share one performance named "Johnny performance" with his contact. Sharing the entire video that lasts 2 hour 15 minutes with the contact may not draw proper attention from the contact. Instead the user publishes the tag named "Johnny performance". As a result, the data for the specific portion of the video lasts only 3.5 minutes.

According to one embodiment, once the user decides to publish a tag (i.e., a specific portion of the video), a server (e.g., the server 110 of FIG. 1A) is configured to receive the starting time and the ending (or a period thereof) of the video, and generate a file that has a URL to the source video along with the specific time duration. A link to the file may be embedded in a page shared with the contact. Alternatively a link to a webpage (implemented in HTML) may be transported to the contact via email or instant messaging. Upon activating the link, the contact can see the specific portion of the view that is most interesting to him. FIG. 3E also shows two exemplary views the contact may immediately see when activating the link. One view 368 shows a video player starting right at the stating time of the specific portion of the video defined by the tag named "Johnny performance" in which case a viewer sees only the specific portion of the video. Another view 370 shows a video player starting right at the starting time of the specific portion of the video defined by the tag named "Johnny performance" but indicating on a progress bar that it is only a portion of an entire video. The view 370 gives an option to the viewer that if needed he may move the progress bar to start from the beginning of the video.

The server 110 of FIG. 1A is configured to manage a plurality of accounts, each for a registered user. Over the times, users may have created many published videos. To facilitate a user to look for videos with similar subjects, according to one embodiment of the present invention, various tags created by the users are indexed in a database unless a published video is made available to only a group of designated viewers. It is assumed that an author puts no restrictions on a published video. In operation, the server 110 is configured to extract keywords or symbols from the tags and index them in the database when the created or modified tagging files are saved on the server 110. When a user is looking for videos related to his interest, he may input one or two keywords or a search string including an operator on the keywords. Upon receiving the search string, the server 110 is configured to produce a table including tags, each defining a video portion related to the subject he is looking for.

FIG. 3F shows an exemplary generated table 372 based on a search string "cooking AND Asian", indicating a user is looking for videos related to Asian cooking. The table 372 shows specifically that there are at least two video portions (from one or two source videos) referenced by two tags 373 and 375 that include the matched search strings. Depending on the implementation, the original authors may classify the tags as a subject of Asian cooking or the server is configured to automatically classify the tags. Since it is a table being requested by a user, in one embodiment, the server is designed to insert one or more conditional tags in the table.

As shown in FIG. 3F, there are two tags 374 and 376 related to the subject of cooking for advertising cooking ware and foods.

Referring to FIG. 3G, it shows a flowchart or process 380 of generating a table based on a search string from a user. Depending on implementation, the process 380 may be implemented in software or a combination of software and hardware. The process 380 may be better understood in conjunction with previous figures and is initiated when the user requests to search all relevant video portions pertaining to a subject expressed by the user.

At 382, the server determines whether a search string is received from the user. Similar to the search engine provided by Google (www.google.com), there is no limitations as to how a search string may be formed. A search string may be one or more signs, symbols, or words. A search string may also include one or more logic operators. At 384, it is assumed that such a search string is received, the server is designed to conduct a search against a database per the search string. The database is constantly populated whenever a registered user saves a tagging file. It should be noted that the search may be conducted based on a subject, not necessarily only on a match of keywords. At 386, relevant tags substantially representing the search string are located. A table of the tags is generated by the server. Depending on implementation, such a table may be transported to the user directly, but in general, the table is modified at 388 to include some conditional tags or tags related to advertisements (commercial tags). In one embodiment, the commercial tags may be auctioned among advertisers regarding their orders, positions and appearance in the generated table.

At 390, the table (e.g., the generated table 372 of FIG. 3F) is returned to the user in responding to the search string provided by the user. In one embodiment, a display similar to the display 200 of FIG. 2B is provided with the received tags. The user may select any one of the tags to video the corresponding video portion. Sometimes, one of the advertisement tags may be automatically activated initially and continuously shown till the user selects one of the subject tags. In general, the automatically activated commercial tag would be the most expensive to the advertisers compared with other commercial tags in the table.

In some cases, the user may refine his search when he sees a table with many tags. he may add an additional sign, symbol or word to the original search string. Thus the process 380 goes back to 380 to generate an updated table. The user shall receive an updated table, presumably with less tags. it should be noted that the process 380 does not interfere with the video data of the corresponding video portions, all is being down with the tags respectively defining the video portions. The video data would only be loaded per a tag when the user selects the tag.

Figure 4A:
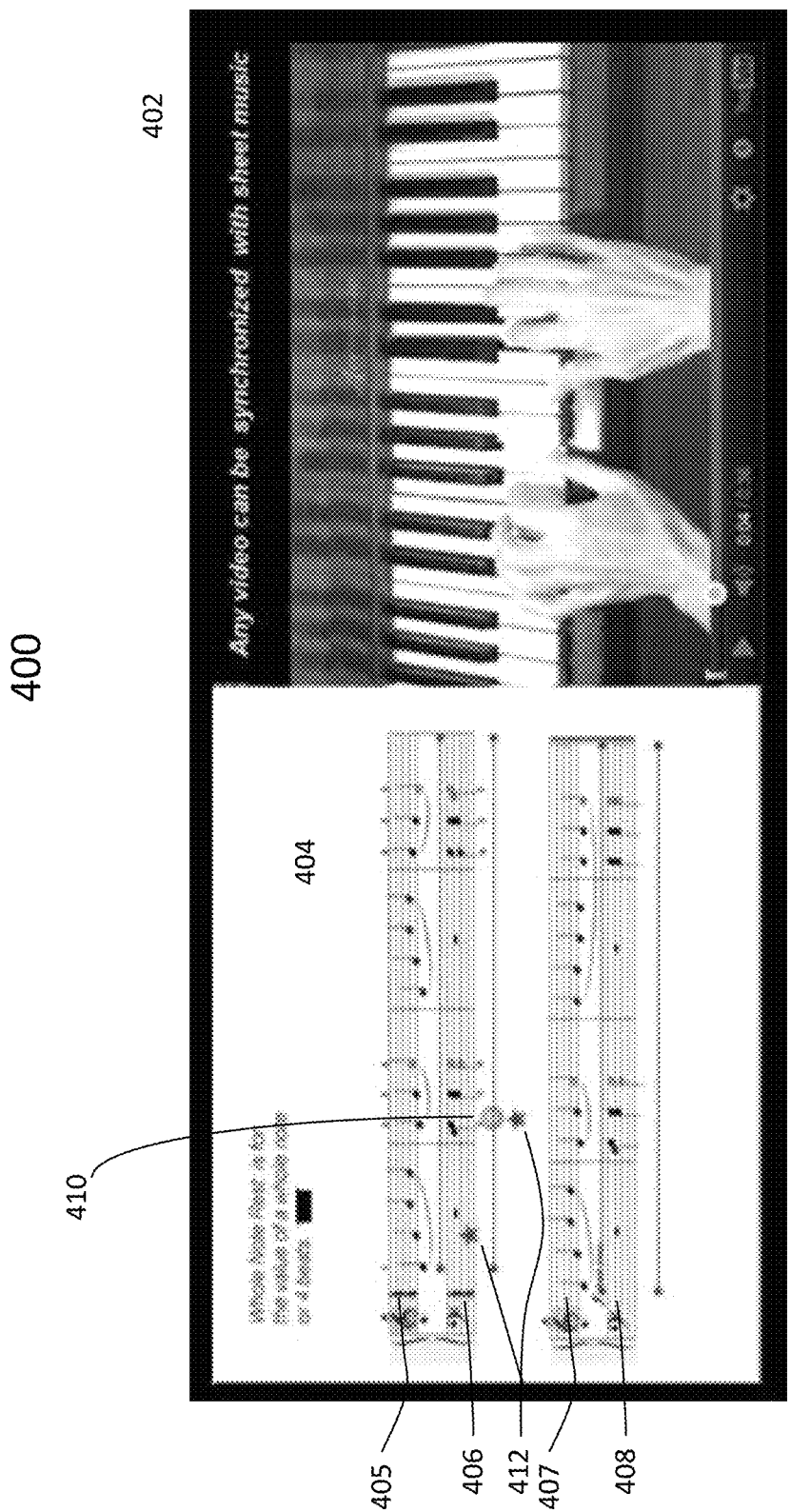
FIG. 4A shows a display including a window to show a published video and a table in which tags are graphically organized and overlaid on a music score to track a playing progress.

Referring now to FIG. 4A, it shows a display 400 including a window 402 to show a published video and a table 404 in which tags are graphically overlaid on a music score (or sheet music) 404. Differently from the display in FIG. 2A or FIG. 2B, the display 400 presents tags resembled in music notes. A corresponding progress of a defined video is substantially synchronized with the music notes in display 402. As an example, each tag is created for a section of music. There are four tags 405, 406, 407 and 408 in the music score 404, each representing one type of playing. In other words, any one of the tags 405, 406, 407 and 408 in the music score 404 may be selected and a corresponding video portion is played. A progress bar presented under each of the tags 405, 406, 407 and 408 is provided to show the corresponding progress. As the piano video is being played back, a corresponding sign (e.g., a dot 410) is highlighted and moved along in synchronization with the note being played. As a result, a viewer sees which note is being played.

In one embodiment, one or more subtags or conditional tags are provided, two of them 412 are shown in FIG. 4A. These tags are highlighted to notify a user or viewer that there is additional information that may be viewed if clicked. In one embodiment, it is a subtag defining a supplemental video portion providing additional details of playing a section of notes, where the supplemental video portion may be from the current source video or another source video (with a different URL). By clicking the subtag, the viewer can see the details relating to the play of the notes while pausing the video portion being played back. As soon as the supplemental video portion is done, the original video portion is resumed automatically or manually.

In another embodiment, the subtag is conditional. The viewer is required to fulfill a condition before the subtag is set to go away or skipped. From a business perspective, the conditional subtag may be used to advertise a product or a service related to what is being watched (e.g., piano or online education).

Figure 4B:
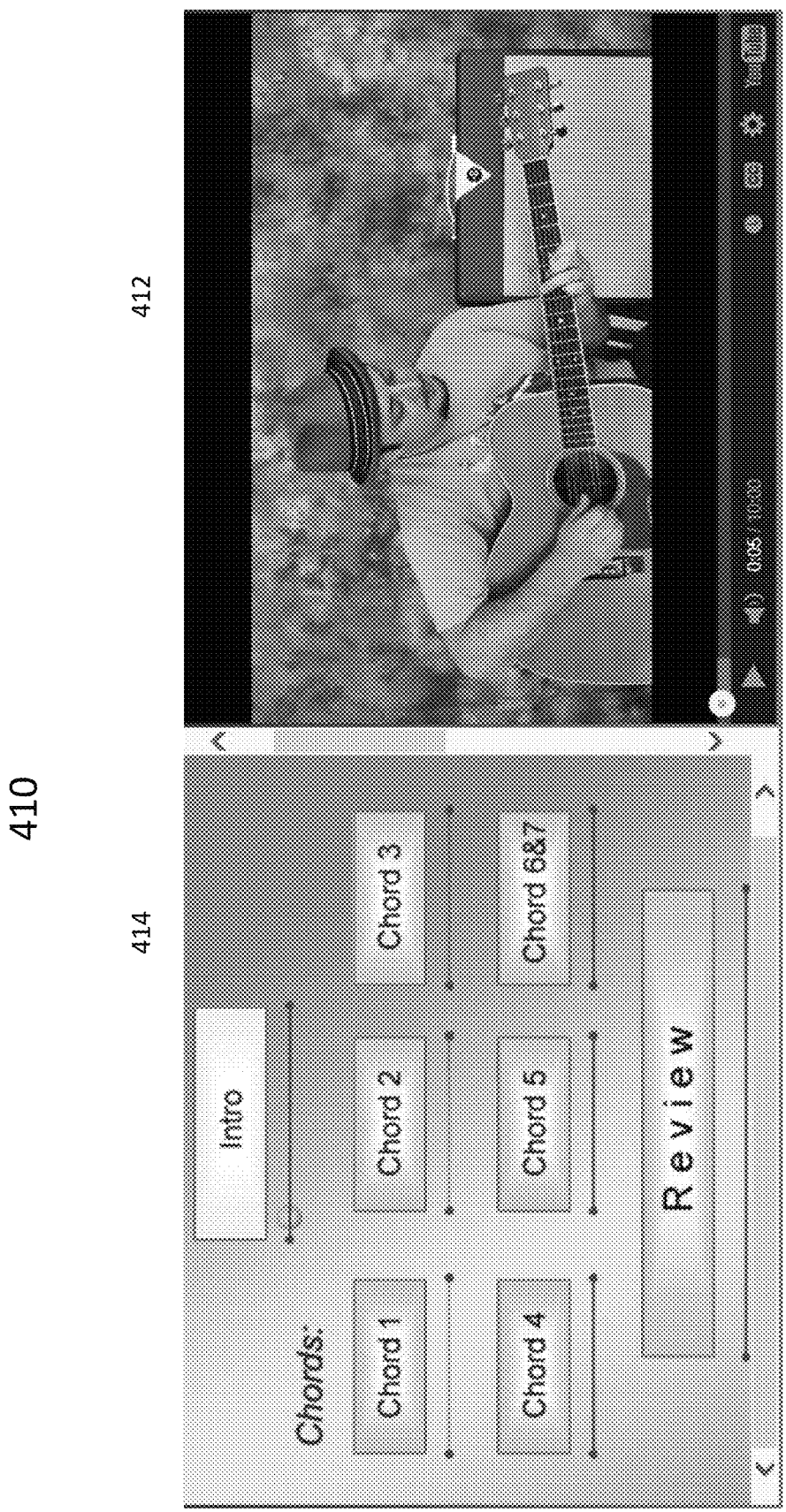
FIG. 4B shows a guitar video in which the guitar has six strings, a display includes a window to show the published guitar video and a table in which tags are graphically organized and overlaid with a graph.

As another example, FIG. 4B shows a guitar performance or lesson video. The display 410 includes a window 412 to show the published guitar video and a table 414 (score) in which tags are graphically organized and respectively overlaid in accordance with seven chords, where one tag corresponds to two chords. The display 410 presents graphically organized tags that represent corresponding chords. As an example, each tag is created as a chord. In other words, as the guitar video is played back, a corresponding chord is highlighted in the table 414 and a time or progress bar is presented under a corresponding chord to show the progress of playback of the chord. Likewise, any of the chords in the table 414 is selected, a corresponding video portion is activated and played back. It is believed that those skilled in the art can now appreciate that one of the advantages, benefits and objectives in the present invention is to provide a two-way or mutual visual mapping between a video and a graphic representation. The table 414 also shows an introduction part and a review part, each of the parts (corresponding to a tag) is formed to show a specific portion of the source video or a collection of selected video portions for a viewer to have a different view of the source video.

Figure 4C:
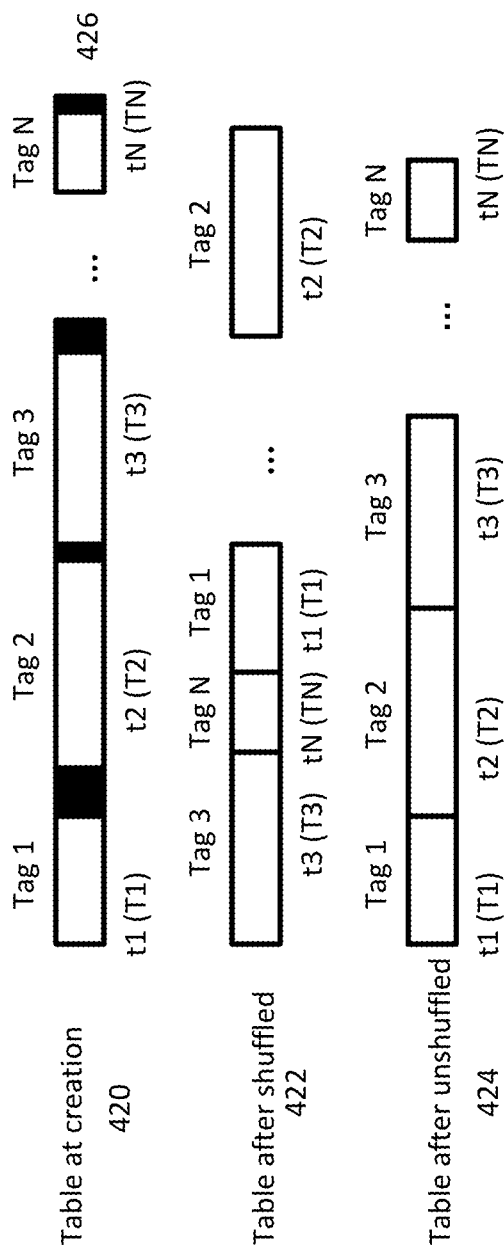
FIG. 4C shows an exemplary table at creation, a shuffled table and an unshuffled (restored) table.

Referring now to FIG. 4C, it shows an exemplary table 420 at creation, a shuffled table 422 and an unshuffled (restored) table 424. The table 420 is created based on a source video represented in a video data streaming 426. The table 420 includes N tags, each corresponding to a video portion defined by a starting time t and a duration T, for example, a video portion corresponding to Tag 2 starts at time t2 and lasts for a period of T2. The created table 420 is then reordered or shuffled to create a shuffled table 422. In other words, the tags in the table 420 are reordered in a way desired by the author thereof. If a viewer desires, the table 422 may be reordered again. According to one embodiment, an interface is provided to allow a viewer to restore the table 422 to its default so that a viewer may always see a published video in an order arranged by the original author. According to another embodiment, an interface is provided to allow a viewer to restore the table 422 based on the starting times of the tags so that a viewer may see a published video sequentially in time-wise order.

Figure 4D:
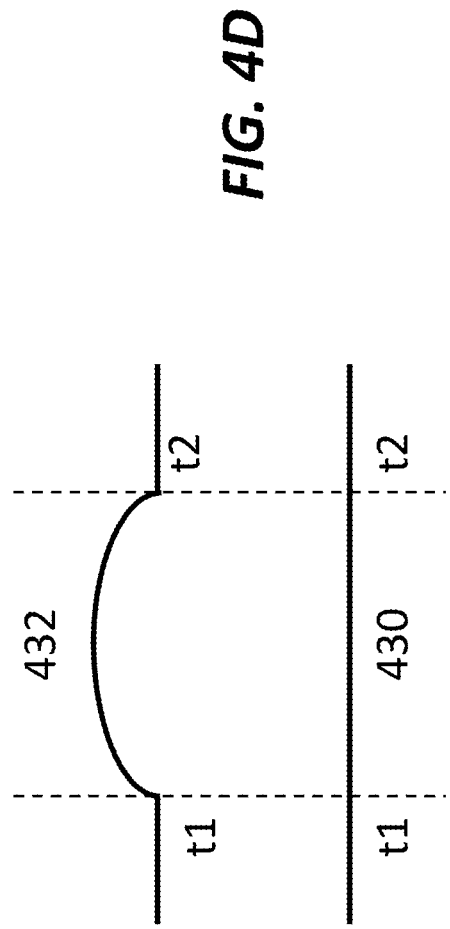
FIG. 4D shows a concept of nonlinear mapping of video advancement and signs or notes.

FIG. 4D shows an abstract illustration of amplification in time. As described above, the progress of playing back a video portion shown in a progress or time bar is linearly synchronized with the advancement of the video data. When graphically represented, for example in FIG. 4A, the relationship between the notes in the music score and the video progress is linear (a straight line 430 shown in FIG. 4D). In music there are places where the music slows down (e.g., ritardando). So the time duration (e.g., t1 . . . t2) needs to be mapped non-linearly on the line. In this case the line becomes a curve 432 in edit mode. The region of that particular sub-span gets mapped on a longer path. Visually the dot 410 of FIG. 4A will show that the tracking of the music notes advances slower in certain regions of the graphically represented tag. The reverse would be the case when the music accelerates within a region, in which case the dot 410 of FIG. 4A shows that the tracking of the music notes advances faster in the region of the graphically represented tag.

Referring now to FIG. 5, there is shown a functional block diagram of a server machine or server 500 in which a server module 502 resides in a memory space 503 and is executable by one or more processors 501. The server 500 may correspond to the server 110 of FIG. 1A and represents one or more server machines configured to perform the server functions desired in one embodiment of the present invention. In one example, the server 200 is to provide administration of users who have registered with and may have created the tagging files for their published videos. In another example, the server 500 is utilized by a service provider to manage conditions for those tags that require some interactions from the user. In still another example, the server 500 is provided as a portal for users to access published videos. In yet another example, the server 500 is configured to provide downloadable application or program that users can download into their own computing devices (e.g., mobile computers) from which they can create tags for a published video and share it with others via a social network or other electronic means.

Depending on implementation, this server 500 may be a single server or a cluster of two or more servers. One embodiment of the present invention is implemented as cloud computing in which there are multiple computers or servers deployed to serve as many businesses or individuals as practically possible. For illustration purpose, a representative of a single server 500 is shown and may correspond to the server 110 in FIG. 1A. In one embodiment, the process 300 of FIG. 3A or the process 340 of FIG. 3C works independently but can be enhanced when working with the server 500.

The server device 500 includes a network interface 504 to facilitate the communication between the server device 500 and other devices on a network, and a storage space 505. The server module 502 is an executable version of one embodiment of the present invention and delivers, when executed, some or all of the features/results contemplated in the present invention. According to one embodiment, the server module 502 comprises an administration interface 506, an account manager 508, a client manager 510, a security manager 512, an conditions manager 514, and a data processing module 516.

Administration Interface 506:

As the name suggests, the administration interface 506 facilitates a system administrator to register a user (e.g., an individual or a business entity) and grant certain controlled services to the registered users. Examples of the controlled services may include version controls on modified tags by a viewer, and distribution of a published video with or without embedded advertisements via one or more tags. In one embodiment, the administration interface 506 allows a service provider to manage all subscribing accounts and determine what and how much to charge for a service. In one example, businesses or users can create their accounts for a fee. Users can search for businesses just as they would search for a friend. Businesses that have paid will have their certificates of authenticity and be at the top of the search engine. Users will want to search for the businesses to download their published videos (such as restaurant menus or device instruction books). A business can create their advertisements within a published video. Users will want to find businesses in order to access their published videos (e.g., cooking illustration, how-to guides, vacations, SAT sample tests for students, homework or home-study illustrations from teachers, dental procedures, medical operation basic details, etc.). Users may be given the option to follow a certain business to help increase popularity of the business. The popularity of a business can be displayed by some sort of indicator such as the number of followers or subscribers.

Account Manager 508:

The account manager 508 is provided to allow a user to automatically register himself with the server 500 for a service being offered by the server 500 or register with the module running on his computing device. In one embodiment, a user causes the module to be executed for the first time on his device (e.g., iPhone), the module is designed to request the user to enter certain information (e.g., a user name, a true name, etc.) before allowing the user to author a source video or view a published video. After the registration, a profile of the user is created and then transported to the server 500. Although the module provides basic functions to create a tagging file for a published video, there are additional features that are only provided to a paid user. As indicated above, after a fee payment, a subscribing user may be granted to create a published video that can be further modified by another via modification of some of the tags, as a result, the published video may be enhanced to be more illustrative, and/or distributed with certain control without advertisement. According to one embodiment, the account manager 508 indicates to the server 500 that a user who chose not to pay for a service being offered by the server 500 may view certain advertisements in a published video in accordance with a profile of the user, where the advertisements are embedded in a table of tags for the published video. Depending on implementation, the advertisements may be correlated at a level with the label content of the tags and/or the profile of a viewer or the author. Essentially, the account manager 508 is configured to maintain all registered users (paid or free users).

Client Manager 510

The client manager 510 is provided to manage versions of the application provided to the registered users. In one embodiment, there are two versions, one for paying users and the other for non-paying users. The paid version is designed to have more functions than that of the free version. For example, a free version of the module (i.e., a client module) allows a user to create a video of certain length (e.g., 5-minute and one audio track) while a paid version of the module allows a user to create a booklet of any length. Working with the account manager 508, the client manager 510 is configured to release a proper version of the module to a registered user.

Security Manage 512

This module is configured to provide security when needed. The stored data for each of the subscribing businesses or users may be encrypted, thus only authorized user may access the secured data. In some situations, an encryption key to a secured tagging file is securely maintained and may be retrieved by a system administrator to access the secured tagging file in case there is a need. In one embodiment, the security manage 512 is configured to initiate a secure communication session with a client machine when it detects that a registered user or a viewer is authorized to access a tagging file remotely over an open network.

Conditions Manager 514

The conditions manager 514 is a tool provided to control one or more conditional tags in a table of tags for a published video. When a table of tags is created and saved on the server, the conditions manager 514 is configured to register the table. When a viewer desires to access the table of tags to view a published video, the conditions manager 514 is configured to turn one of the tags or insert one tag in the table as a conditional tag so that the viewer has to respond to the conditional tag before being allowed to continue the published video. In one embodiment, the criteria to link the conditional tag may be based on a profile provided by the user or a profile retrieved from a social network where the user shares his published video with his contacts or a viewer desires to view the published video.

Data Processing 516:

This module is configured to perform data operations to determine an interest of users. According to one embodiment, certain social network pages (e.g., facebook) owned by a user are crawled to determine an interest of a user so that the conditions manager 514 can determine an appropriate advertisement for the user. In operation, data obtained from the user (e.g., his profile or data of his personal pages) are analyzed to determine what interest the user may have. When there is a call from the account manager 508 that one or more advertisements shall be served to the user, either via a conditional tag to be inserted in the table of tags in his account at the server 500 or pushed to the device running the client module to author a video or view a published shared by others, the data processing 516 sends its finding to the conditions manager 514 to determine the advertisements. In addition, this module is designed to perform a search based on a search string received from a user and generate a table of tags pertaining to the search string.

In general, the server 500 is configured to provide services at different levels to registered users. In one embodiment, the server 500 allows a user to organize all published videos he has maintained via the corresponding tagging files. These corresponding tagging files may be those originally created by the user, those shared by contacts in a group and those downloaded from the Internet. These corresponding tagging files may be categorized by the user from a computing device coupled to the server 500. In one embodiment, the server 500 is configured to execute a server application substantially similar to the application module 126 of FIG. 1B. A registered user is able to create, view or modify a booklet remotely from a computing device not necessarily installed with the application module 126 of FIG. 1B.

The invention is preferably implemented in software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the description herein is mainly provided based on video, those skilled in the art shall understand that the description is equally applicable to audio applications. Accordingly, the scope of the present invention is defined by the appended claims rather than the foregoing description of embodiments.

I claim:

1. A method for segmenting a source video, the method comprising:
    accessing by a computing device associated with a user, based on a link, the source video located remotely with respect to the computing device;
    displaying a portion of the source video on a display of the computing device without fully loading data representing the source video into the computing device; and
    allowing on the computing device to create a tag file including a plurality of tags in a table, each of the tags corresponding to a time duration to define a video portion in the source video, wherein the time duration is adjusted to define a topic, at least one of the tags is named to reflect the topic in text, the tag file is separate from the source video, the data representing the source video is never modified while the source video is segmented via the tag when the source video is played back on the computing device, wherein
    the tag file is sharable without the data representing the source video enclosed to allow others to view the source video remotely retrieved but locally segmented with the tags in the table.

2. The method as recited in claim 1, wherein the source video is located in a server provided to host a plurality of videos, and the tag file includes the link to the source video.

3. The method as recited in claim 2, further comprising:
    showing a progress bar for each of the tags, wherein a progress indicator is moving while the each of the tags is played back.

4. The method as recited in claim 3, further comprising:
    receiving an activation on any one of the tags out of order by a viewer to view a corresponding video portion; and
    loading the corresponding video portion to a device associated with the viewer.

5. The method as recited in claim 1, wherein the tag file includes a second link to another source video.

6. The method as recited in claim 5, wherein some of the tags define respective topics in the another source video.

7. The method as recited in claim 1, further comprising:
    reordering the tags in the table to impress a viewer in a way different from an impression of the source video when the source video is sequentially played back.

8. The method as recited in claim 1, further comprising highlighting one of the tags when a corresponding video portion is being played back.

9. The method as recited in claim 1, further comprising:
    providing the table of tags;
    modifying the table of tags when at least one of the tags in the table is modified, one of the tags is deleted or a new tag is added to the table; and
    creating an updated tag file to include the modified table of tags.

10. The method as recited in claim 1, wherein the table of tags includes a conditional tag, the method further comprising:
    continuing to play back a portion of the source video only when a condition on the conditional tag is met by the viewer.

11. The method as recited in claim 10, wherein the conditional tag looks different in appearance from other non-conditional tags.

12. The method as recited in claim 10, wherein the condition requires an input from the user.

13. The method as recited in claim 10, wherein the condition includes a request for the viewer to view a separate video, a website or a document.

14. The method as recited in claim 1, further comprising:
    obtaining an interest of a viewer viewing the source video;
    preparing data related to the interest; and
    causing the viewer to access the data.

15. The method as recited in claim 1, further comprising:
    obtaining an inquiry from a viewer;
    conducting a search across all tables of tags accessible by a server hosting a plurality of videos;
    determining a selected set of the tables of tags pertaining to the inquiry; and
    providing a corresponding video portion once one of the selected set of the tables is chosen.

16. A system for segmenting a source video, the system comprising:
    a server configured to manage at least an account for a user, the account including a profile of the user, the server sending a part of but not all data representing the source video to a computing device associated with the user upon receiving a link provided by the computing device, wherein a tag file including a plurality of tags in a table, each of the tags corresponding to a time duration to define a video portion in the source video, the time duration is adjusted by the user to define a topic, at least one of the tags is named to reflect the topic in text, the tag file is separate from the source video, the data representing the source video is never modified while the source video is segmented via the tag file on the computing device, and the tag file is shared without the data representing the source video enclosed to allow others to view the source video remotely retrieved but locally segmented with the tags in the table.

17. The system as recited in claim 16, wherein each of the tags shows a progress bar when selected, wherein a progress indicator is moving along while a video portion corresponding to the each of the tags is played back.

18. The system as recited in claim 17, wherein the server receives an activation on any one of the tags out of order by a viewer to view a corresponding video portion; and
    provides the corresponding video portion to a device associated with the viewer.

19. The system as recited in claim 18, wherein one of the tags is highlighted when a corresponding video portion is being played back.

20. The system as recited in claim 18, wherein the tags in the table are reordered to impress a viewer in a way different from an impression of the source video when the source video is sequentially played back.

* * * * *